US005560999A

United States Patent [19]
Pedicini et al.

[11] Patent Number: 5,560,999
[45] Date of Patent: Oct. 1, 1996

[54] AIR MANAGER SYSTEM FOR RECIRCULATING REACTANT AIR IN A METAL-AIR BATTERY

[75] Inventors: Chris Pedicini, Marietta; Dennis P. Sieminski, Atlanta, both of Ga.; Leonard T. Skeggs, Kirtland, Ohio; Jeffrey E. Young, Peachtree City; Ernest C. Cherry, Doraville, both of Ga.

[73] Assignee: AER Energy Resources, Inc., Smyrna, Ga.

[21] Appl. No.: 447,281

[22] Filed: May 22, 1995

Related U.S. Application Data

[63] Continuation-in-part of Ser. No. 56,440, Apr. 30, 1993, abandoned, and Ser. No. 286,433, Aug. 5, 1994, abandoned, which is a continuation-in-part of Ser. No. 56,440, and Ser. No. 77,827, Jun. 15, 1993, Pat. No. 5,356,729.

[51] Int. Cl.⁶ .................................................. H01M 12/08
[52] U.S. Cl. ........................... 429/27; 429/34; 429/35; 429/72; 429/82
[58] Field of Search ............................... 429/27, 35, 34, 429/49, 72, 82, 83

[56] References Cited

U.S. PATENT DOCUMENTS

| | | |
|---|---|---|
| 684,700 | 10/1901 | Lloyd . |
| 737,613 | 9/1990 | Halsey . |
| 1,112,861 | 10/1914 | Snyder . |
| 1,285,659 | 11/1918 | Ford . |
| 1,363,889 | 12/1920 | Linebarger . |
| 2,273,244 | 4/1940 | Ambruster . |
| 2,275,281 | 1/1938 | Berl . |
| 2,468,430 | 1/1949 | Derksen . |
| 2,687,448 | 8/1954 | Gulick et al. . |
| 2,759,038 | 8/1956 | Marsal . |
| 2,907,809 | 10/1959 | Southworth, Jr. et al. . |

(List continued on next page.)

FOREIGN PATENT DOCUMENTS

| | | |
|---|---|---|
| 0044060 | 1/1982 | European Pat. Off. . |
| 0265242 | 4/1988 | European Pat. Off. . |
| 0293007 | 11/1988 | European Pat. Off. . |
| 0341189 | 11/1989 | European Pat. Off. . |
| 0417324 | 3/1991 | European Pat. Off. . |
| 2353142 | 5/1984 | France . |
| 50-40773 | 5/1988 | Japan . |
| 48-27096 | 2/1991 | Japan . |
| 910149629 | 5/1991 | Japan . |
| 59-134570 | 5/1994 | Japan . |
| 1176488 | 12/1966 | United Kingdom . |
| PCT/CA93/00091 | 3/1992 | WIPO . |
| PCT/US93/02354 | 3/1993 | WIPO . |
| WO94/02966 | 2/1994 | WIPO . |

OTHER PUBLICATIONS

"Thermal Management of the Iron-Air Battery System," B. G. Demczyk and R. E. Grimble, 1046B Extended Abstracts, vol. 81-2, (1981) Oct. Pennington, New Jersey, USA (month N/A).

Gregory, Metal-Air Batteries, 1972, pp. 33-39, 48-51, 77-79 (month N/A).

Collins, Power Sources 2: Research and Development In Non-Mechanical Power Sources, 1968, pp. 423, 429-434, 438-439 (month N/A).

*Primary Examiner*—M. Nuzzolillo
*Attorney, Agent, or Firm*—Jones & Askew

[57] ABSTRACT

An air manager is disclosed which recirculates reactant air in a battery and exchanges only a minimal amount of recirculated air for ambient air that is necessary to maintain a sufficient oxygen concentration in the battery. In the air manager, the reactant air is recirculated in a defined air pathway that provides reactant air to the entire area of all the air cathodes. A catalyst element is also provided in the air manager to convert the hydrogen gas that is generated during the recharge of a metal-air battery to water vapor. The air manager is nevertheless compact and lightweight so that the resulting battery is portable.

45 Claims, 9 Drawing Sheets

U.S. PATENT DOCUMENTS

| | | |
|---|---|---|
| 3,160,528 | 12/1964 | Dengler . |
| 3,288,644 | 11/1966 | Delfino . |
| 3,372,060 | 3/1968 | Platner . |
| 3,395,047 | 7/1968 | Terry et al. . |
| 3,411,951 | 11/1968 | Gelting . |
| 3,457,115 | 7/1969 | Kent . |
| 3,473,963 | 10/1969 | Sanderson . |
| 3,523,830 | 8/1970 | Baker et al. . |
| 3,553,029 | 1/1971 | Kordesch et al. . |
| 3,576,677 | 4/1971 | Keating, Jr. et al. . |
| 3,607,423 | 7/1971 | Bertioli . |
| 3,615,839 | 10/1971 | Thompson . |
| 3,740,636 | 6/1973 | Hogrefe et al. . |
| 3,746,580 | 7/1973 | Aker et al. . |
| 3,832,238 | 8/1974 | Marui . |
| 3,840,404 | 10/1974 | Porter et al. . |
| 3,855,000 | 12/1974 | Jammet . |
| 3,871,920 | 3/1975 | Grebier et al. . |
| 3,897,265 | 7/1975 | Jaggard . |
| 3,898,548 | 12/1975 | Peralle et al. . |
| 3,902,922 | 9/1975 | Kalnoki-Kis . |
| 3,904,441 | 9/1975 | Badger . |
| 3,963,519 | 6/1976 | Louie . |
| 3,994,748 | 11/1976 | Kunz et al. . |
| 4,002,496 | 1/1977 | Nitta et al. . |
| 4,054,725 | 10/1977 | Tuburaya . |
| 4,098,964 | 7/1978 | Reber . |
| 4,105,830 | 8/1978 | Kordesch . |
| 4,118,544 | 10/1978 | Pryzbyla et al. . |
| 4,177,327 | 12/1979 | Matthews et al. . |
| 4,189,526 | 2/1980 | Cretzmeyer et al. . |
| 4,207,514 | 6/1980 | Klein . |
| 4,246,324 | 1/1981 | de Nora et al. . |
| 4,262,062 | 4/1981 | Zatsky . |
| 4,279,970 | 7/1981 | Breault et al. . |
| 4,352,067 | 9/1982 | Ottone . |
| 4,364,805 | 12/1982 | Rogers . |
| 4,369,235 | 1/1983 | Bursell . |
| 4,448,858 | 5/1984 | Graf et al. . |
| 4,490,443 | 12/1984 | Ruch et al. . |
| 4,493,880 | 1/1985 | Lund . |
| 4,521,497 | 6/1985 | Tamminen . |
| 4,588,660 | 5/1986 | Shimizu et al. . |
| 4,588,661 | 5/1986 | Kaufman et al. . |
| 4,620,111 | 10/1986 | McArthur et al. . |
| 4,687,714 | 8/1987 | Oltman et al. . |
| 4,693,946 | 9/1987 | Niksa et al. . |
| 4,729,930 | 3/1988 | Beal et al. . |
| 4,738,905 | 4/1988 | Collins . |
| 4,756,980 | 7/1988 | Niksa et al. . |
| 4,828,939 | 5/1989 | Turley et al. . |
| 4,842,963 | 6/1989 | Ross, Jr. . |
| 4,857,885 | 8/1989 | Umerez . |
| 4,871,627 | 10/1989 | Strong et al. . |
| 4,885,217 | 12/1989 | Hoge . |
| 4,885,218 | 12/1989 | Andou et al. . |
| 4,894,295 | 1/1990 | Cheiky . |
| 4,908,281 | 3/1990 | O'Callaghan . |
| 4,911,993 | 3/1990 | Turley et al. . |
| 4,913,983 | 4/1990 | Cheiky . |
| 4,925,744 | 5/1990 | Niksa et al. . |
| 4,927,717 | 5/1990 | Turley et al. . |
| 4,950,561 | 8/1990 | Niksa et al. . |
| 4,957,826 | 9/1990 | Cheiky . |
| 5,069,986 | 12/1991 | Dworkin et al. . |
| 5,093,212 | 3/1992 | Lloyd et al. . |
| 5,187,746 | 2/1993 | Narisawa . |
| 5,328,777 | 7/1994 | Bentz et al. . |
| 5,354,625 | 10/1994 | Bentz et al. . |
| 5,356,729 | 10/1994 | Pedicini ..................................... 429/27 |
| 5,362,577 | 11/1994 | Pedicini . |
| 5,387,477 | 2/1995 | Cheiky . |

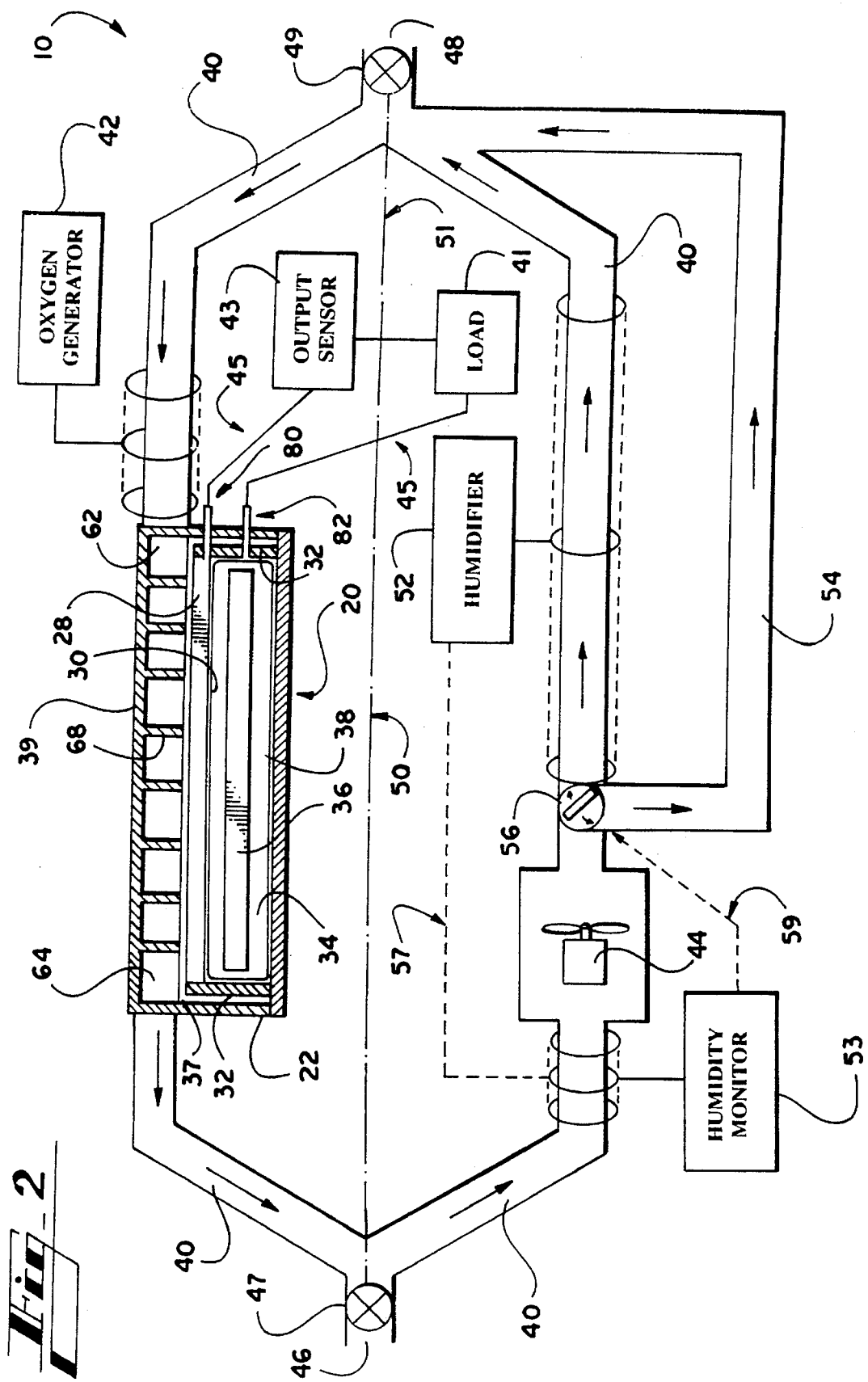

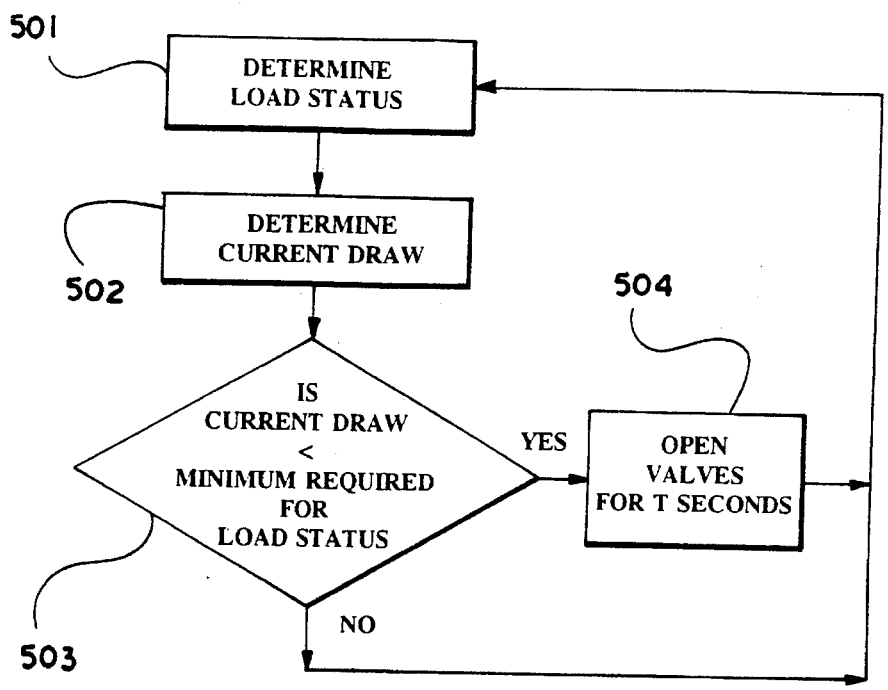
Fig_5
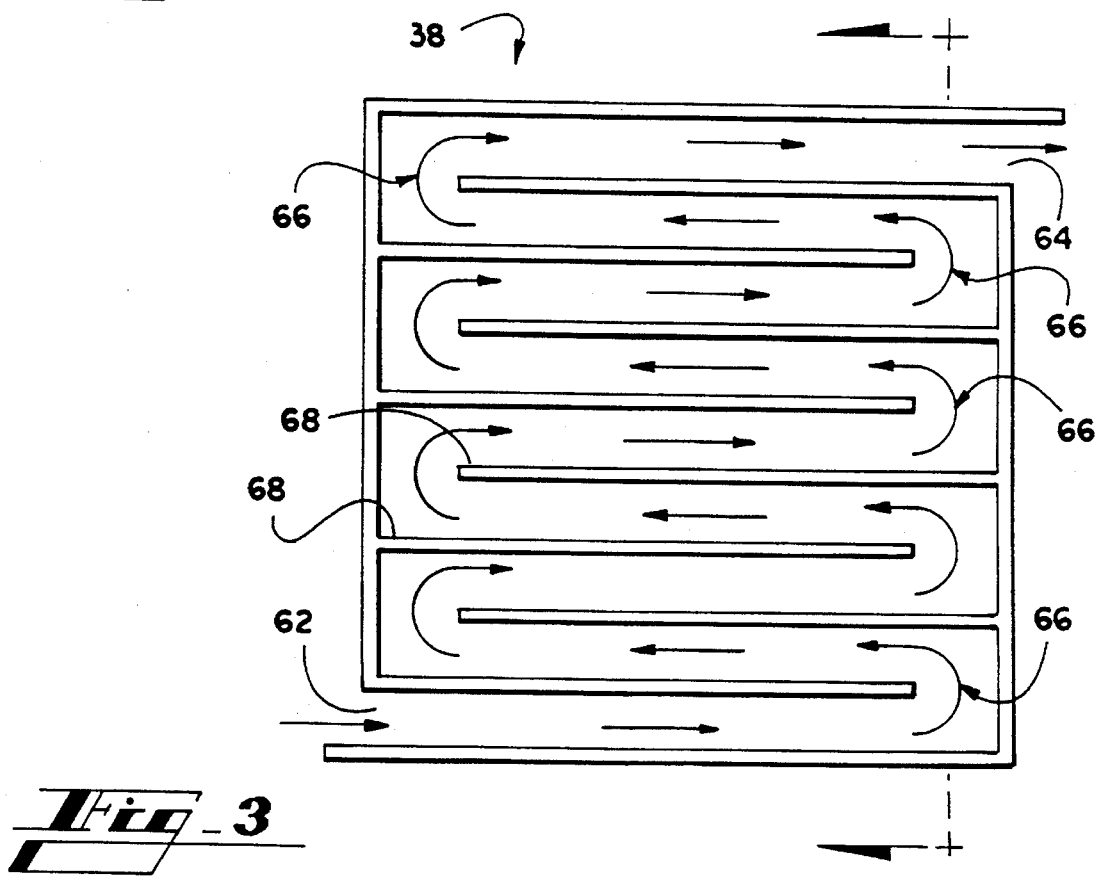
Fig_3

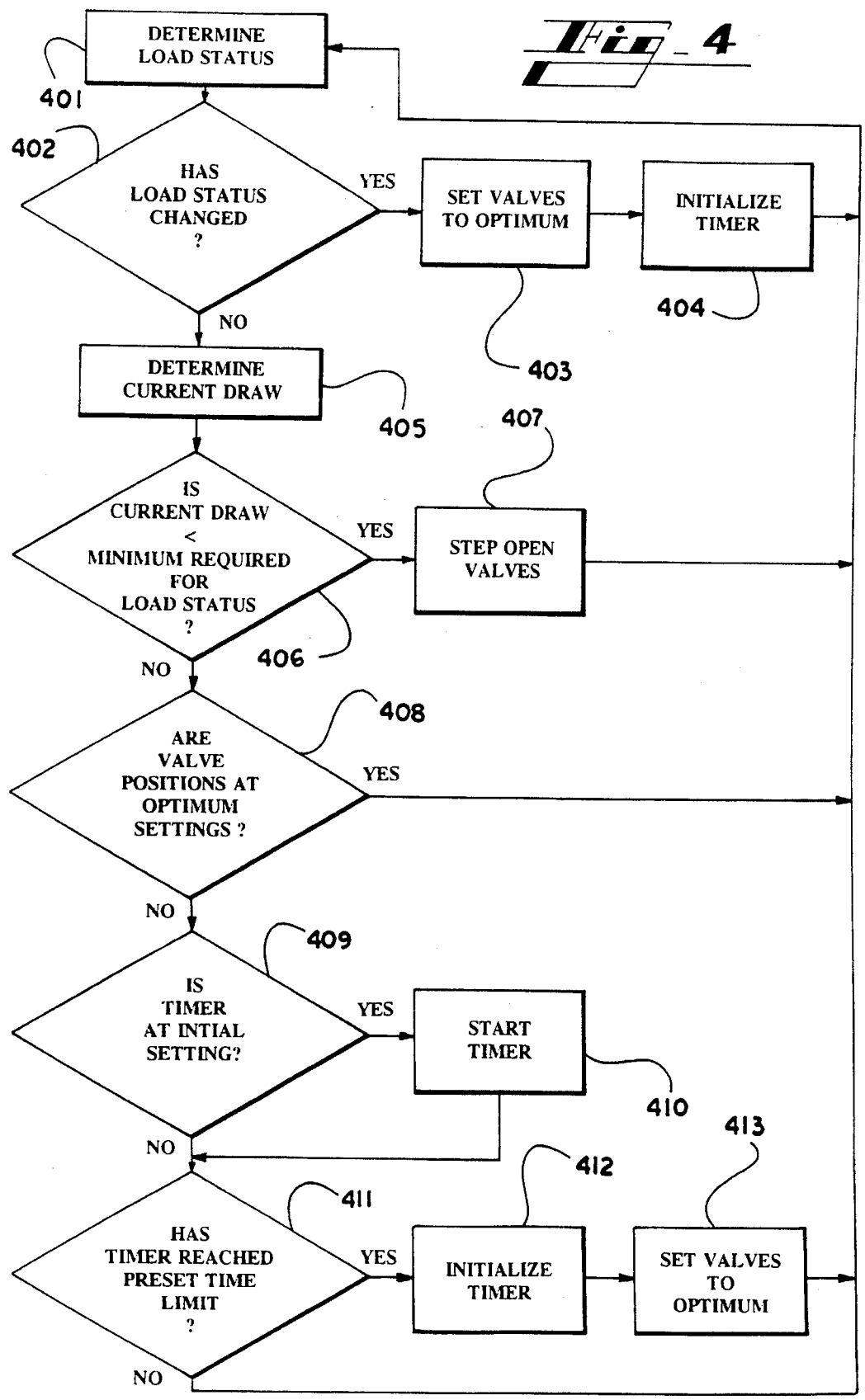

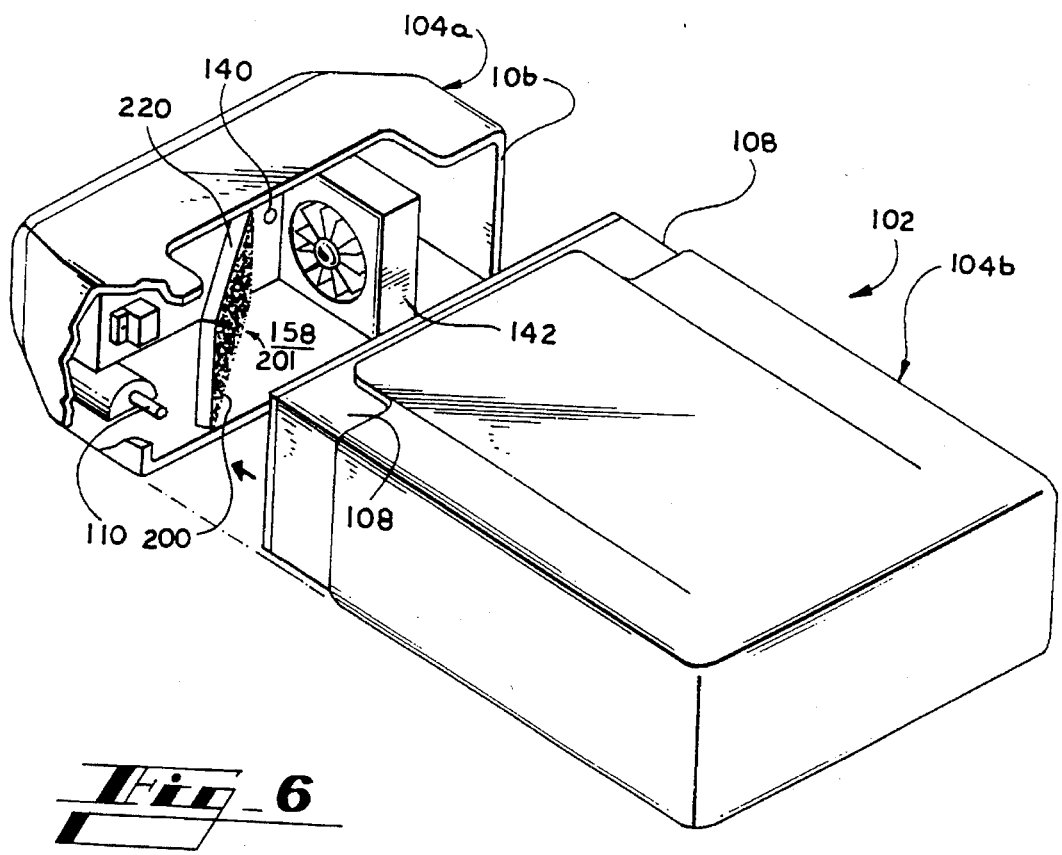
Fig_6
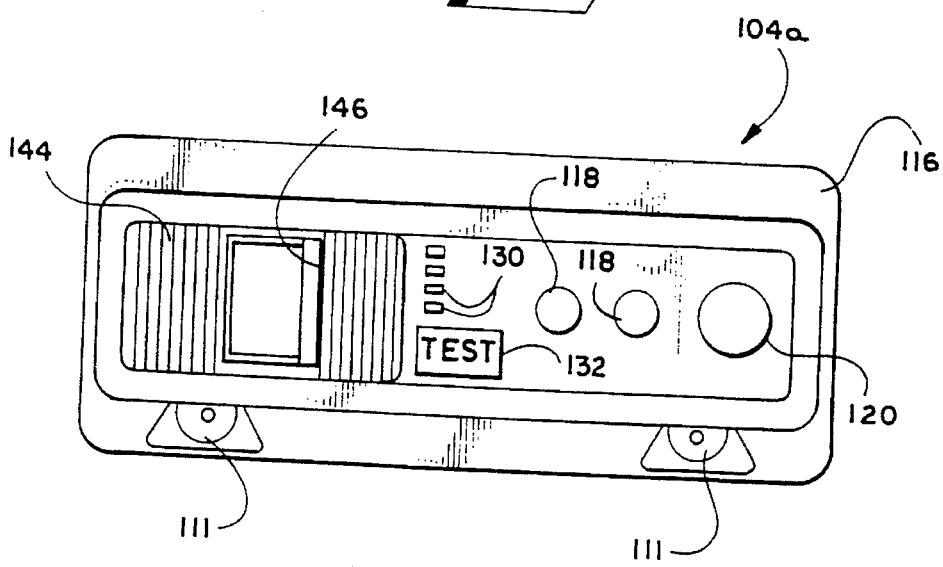
Fig_8

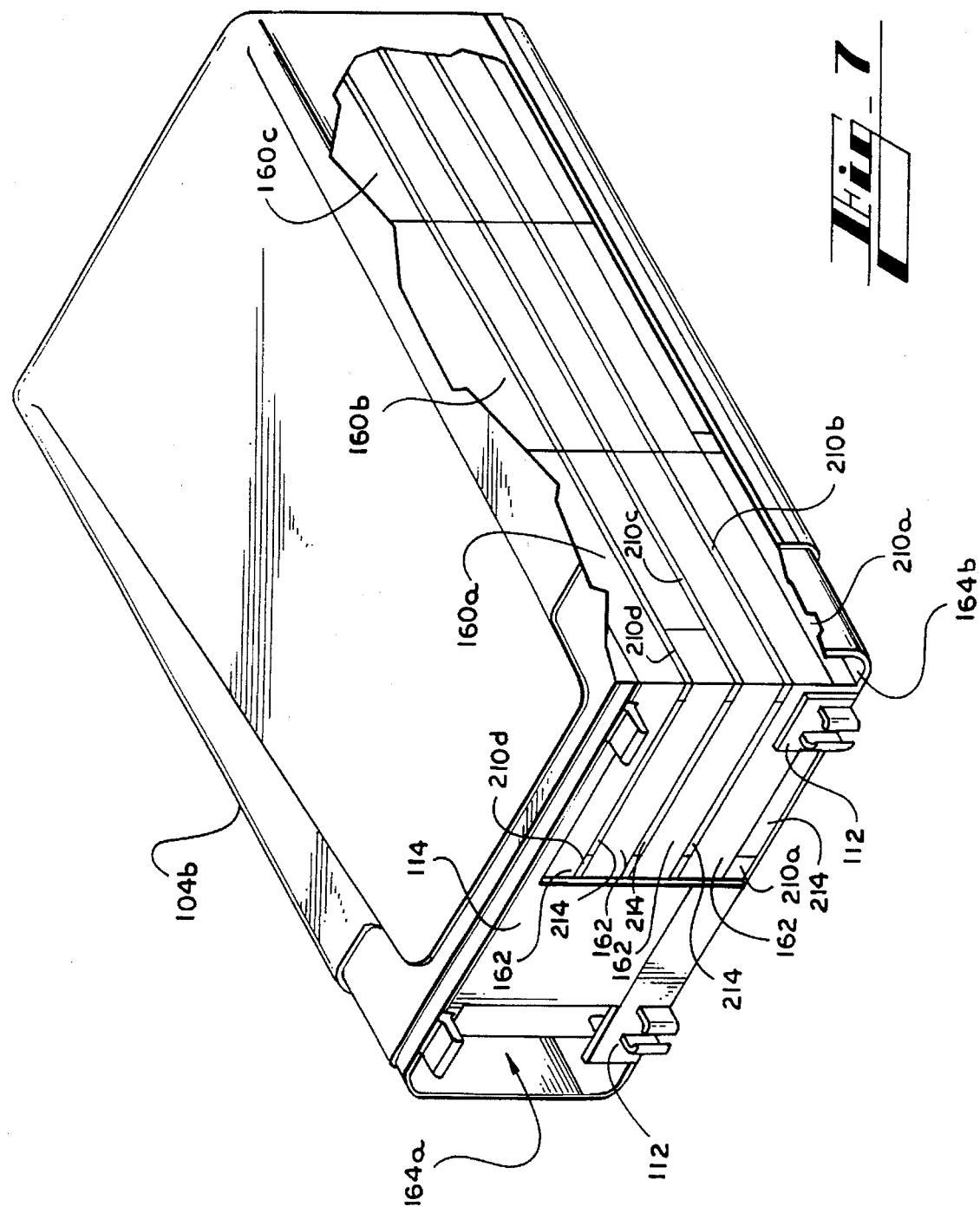

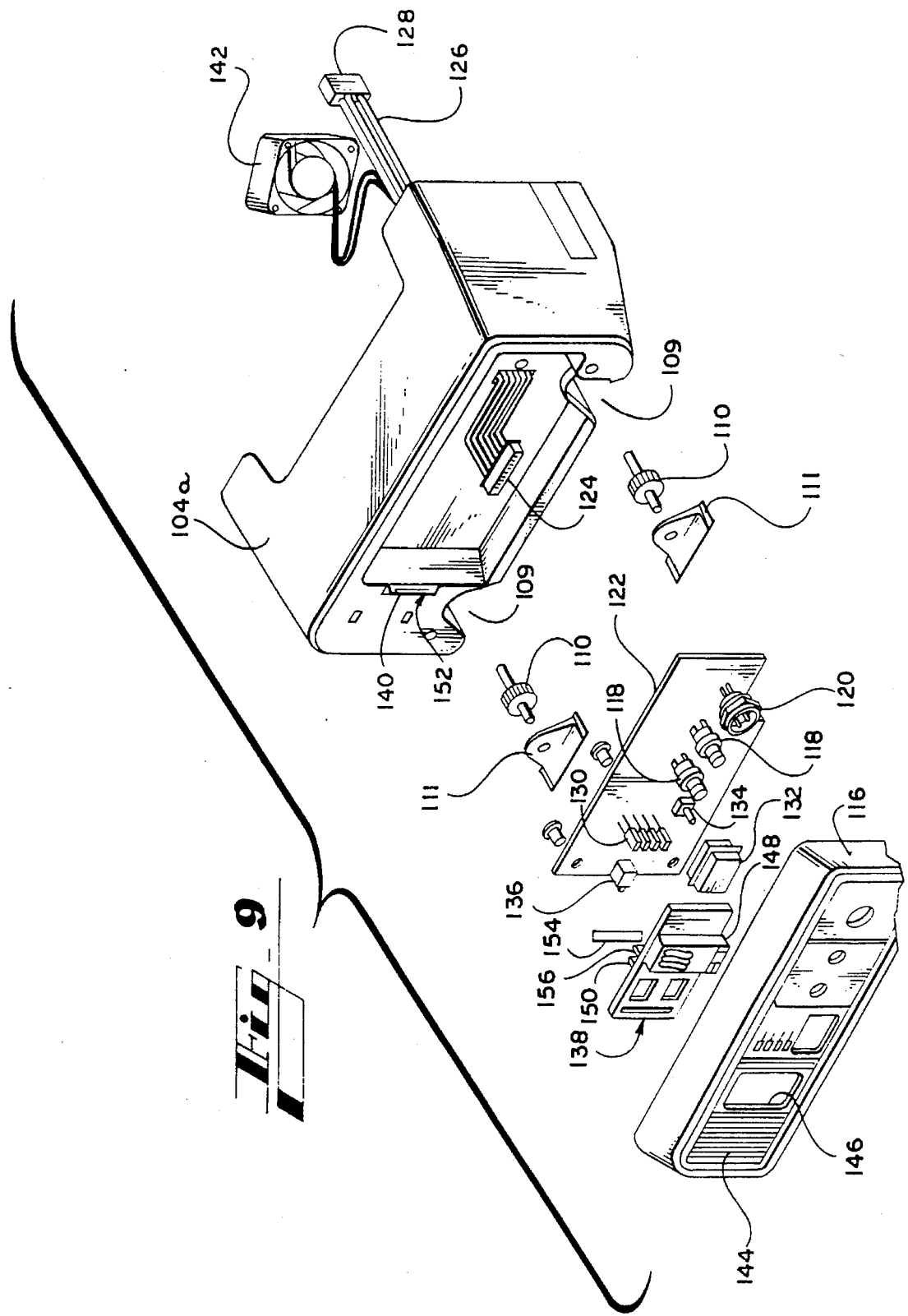

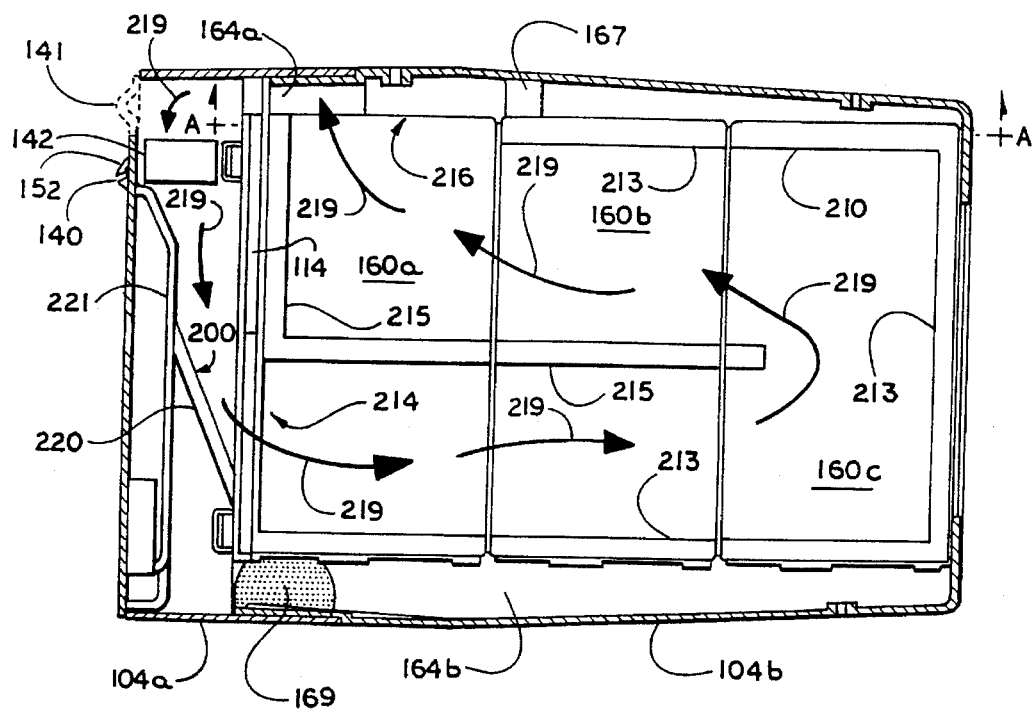
FIG_11
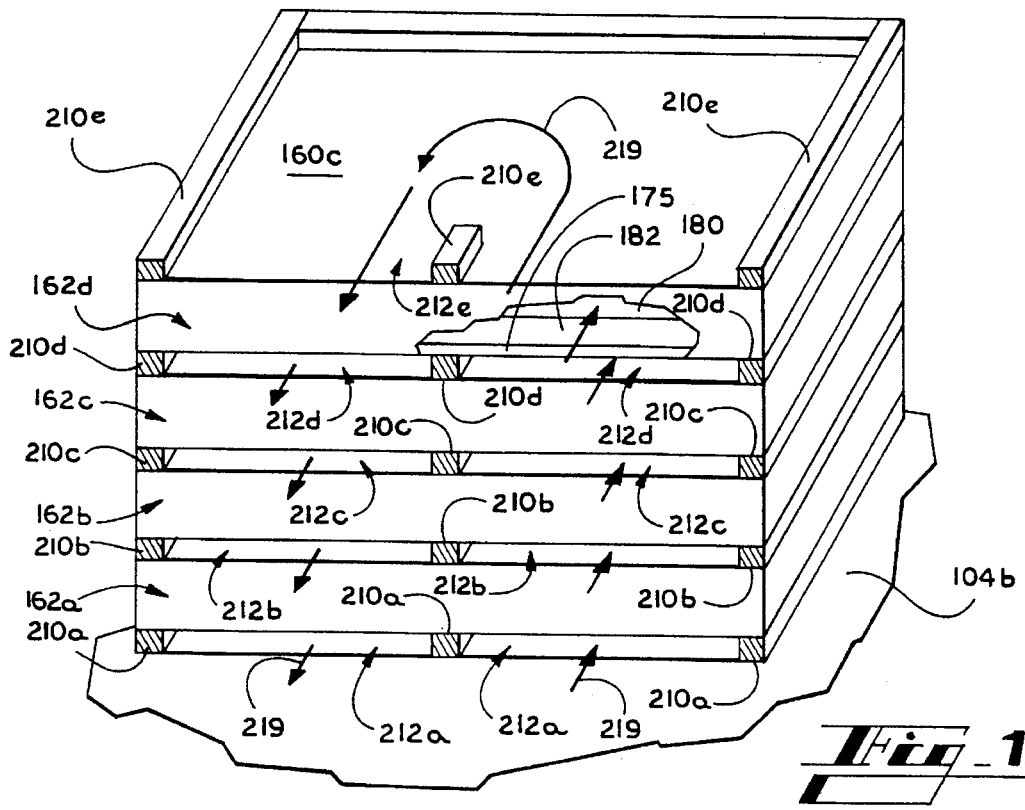
FIG_12

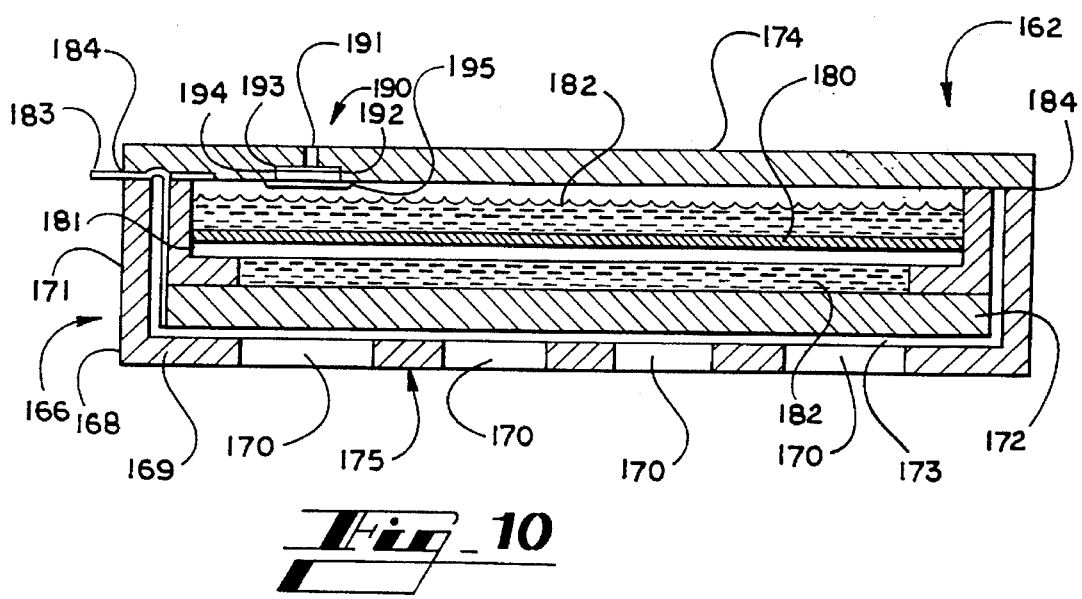
Fig_10
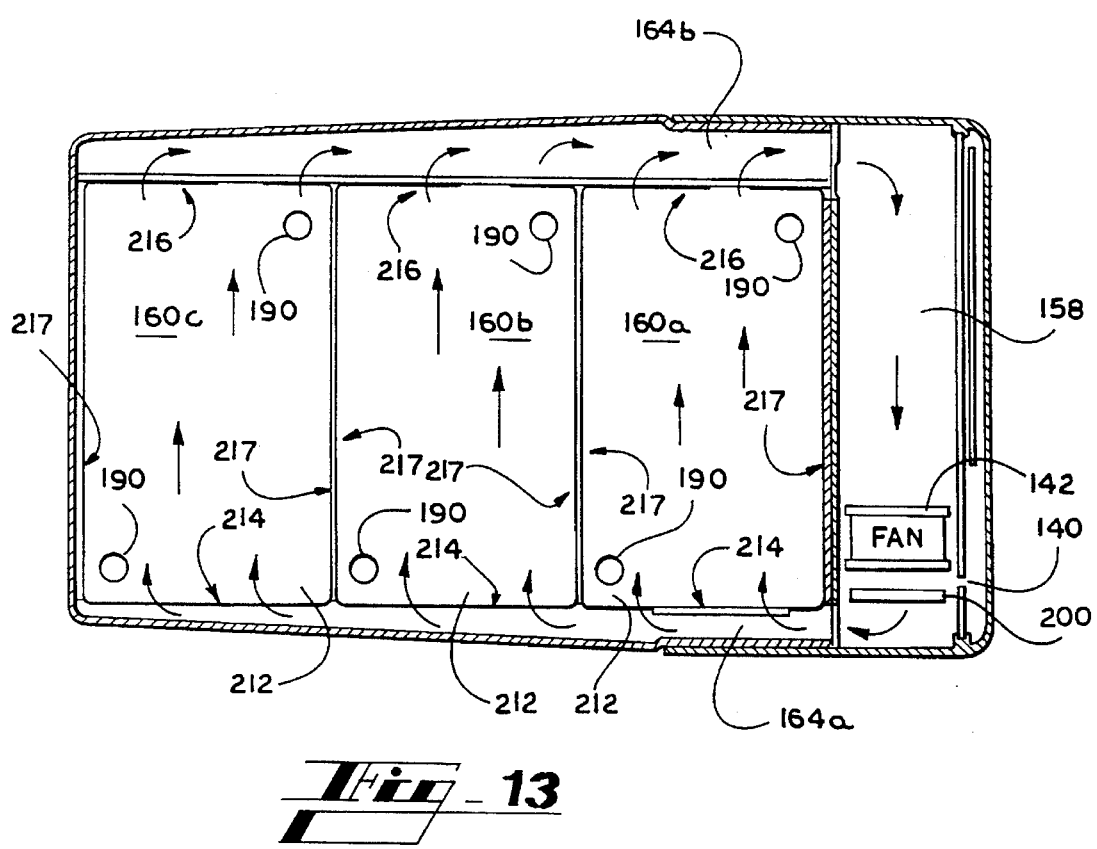
Fig_13

AIR MANAGER SYSTEM FOR RECIRCULATING REACTANT AIR IN A METAL-AIR BATTERY

CROSS-REFERENCE TO RELATED APPLICATIONS

This a continuation-in-part of U.S. patent applications Ser. No. 08/056,440, filed Apr. 30, 1993 now abandoned, and U.S. Ser. No. 08/286,433, now abandoned filed Aug. 5, 1994, which is a continuation-in-part of U.S. patent applications Ser. No. 08/056,440, filed Apr. 30, 1993, now abandoned and Ser. No. 08/077,827, filed Jun. 15, 1993, now U.S. Pat. No. 5,356,729.

TECHNICAL FIELD

The present invention relates generally to air manager systems for metal-air batteries, and more particularly to an air manager system for recirculating reactant air in a metal-air battery.

BACKGROUND OF THE INVENTION

Metal-air batteries are comprised of multiple electrochemical cells. Each cell is further comprised of an air permeable cathode and a metallic anode separated by an aqueous electrolyte. Metal-air batteries have a relatively high energy density because they utilize oxygen from ambient air as a reactant in the electrochemical reaction rather than a heavier material, such as a metal oxide or other depolarizable metallic composition. For example, during discharge of a zinc-air battery cell, oxygen from ambient air is converted at the cathode to hydroxide ions, zinc is oxidized at the anode, reacts with the hydroxide ions, and water and electrons are released to provide electrical energy.

Metal-air cells that are rechargeable and thus useful for multiple discharge cycles are called secondary cells. Electrically rechargeable metal-air cells are recharged by applying a voltage between the anodes and cathodes of the cells and reversing the electrochemical reaction. During recharging, the cell anodes are electrolytically reformed by reducing to the base metal the metal oxides formed during discharge. The electrolytic reformation generates a large amount of oxygen and a small amount of hydrogen which are discharged through the air permeable cathodes and through the vents of the cells, respectively.

Because metal-air batteries use oxygen from ambient air as a reactant in the electrochemical reaction, they provide a relatively light weight and compact power supply. Further, because they are rechargeable, metal-air batteries are an ideal source of power for portable equipment, such as portable computers and telephones.

The anodes are made from metals that can be oxidized during discharge in a metal-air cell to produce electrical energy. Such metals include lead, zinc, iron, cadmium, aluminum and magnesium. Zinc is normally preferred because of its availability, energy density, safety, and relatively low cost.

A suitable electrolyte is an aqueous electrolyte including Group I metal hydroxides such as LiOH, NaOH, KOH, CsOH, or the like.

Metal-air battery cells are often arranged in multiple cell battery packs within a common housing to provide a sufficient amount of power output. The housing is necessary to seal-off the cells from the ambient air to prevent self-discharge of the cells during periods of non-use, which would result in a decreased battery output and lifetime. Because of the housing, however, it is necessary to provide a supply of oxygen to the cells when they are in use.

Typically, the oxygen is supplied by ambient air, which contains approximately 21% oxygen. The ambient air enters through ventilation holes in the housing that are open during cell use. In the housing, the ambient air is swept across the air cathodes of the cells as reactant air. As the reactant air crosses the air cathodes, the oxygen is depleted by reaction with the cells. After the reactant air has passed across the air cathodes of the cells, it is exhausted outside of the housing. Thus, during cell use, ambient air is drawn into the housing in a continuous flow that is sufficient to achieve the desired power output. Such an arrangement is shown in U.S. Pat. No. 4,913,983 to Cheiky, wherein a fan within the battery housing is used to supply a flow of ambient air to the air cathodes of the metal-air cells.

A problem associated with supplying oxygen from the ambient air, however, is that the humidity of the ambient air can cause a metal-air battery to fail. Equilibrium vapor pressure of the metal-air battery results in an equilibrium relative humidity that is typically about 45%. If ambient humidity is greater than the equilibrium relative humidity value for the metal-air battery, the metal-air battery will absorb water from the air through the cathode and fail due to a condition called flooding. Flooding may cause the battery to leak. If the ambient humidity is less than the equilibrium relative humidity value for the metal-air battery, the metal-air battery will release water vapor from the electrolyte through the air cathode and fail due to drying out. In most environments where a metal-air battery is used, failure occurs from drying out, In the past, attempts have been made to solve the problems of flooding and drying out by controlling the flow of ambient air and reactant air. To gain more control over reactant air, one prior design separates the reactant air flow from a cooling air flow. In this design the reactant air flow rate is reduced relative to the cooling flow to reduce flooding or drying out effects. It has also been suggested prior to the present invention to control the humidity of air flowing into an air battery.

Specific examples of air managers that control the flow of reactant air are shown by U.S. Pat. No. 4,729,930 to Beal et al. and U.S. Pat. No. 4,913,983 to Cheiky, which is noted above. Beal discloses an apparatus for regulating and augmenting air supply for a fuel cell power plant during transient load increases. Beal provides a load monitor that has its output connected to the input of a microprocessor, the output of which adjusts a motor-controlled valve in the air supply line. In order to prevent oxygen starvation of the fuel cell when the imposed load increases Beal calculates the time needed for the control valve to reach a setting which allows an oxygen flow to meet increased load demand. According to Beal, when the oxygen supply cannot be increased through the control valve rapidly enough to immediately meet load demand, Beal provides auxiliary solenoid valves which open at the instant of increased load demand so as to provide oxygen to the fuel cell more quickly. The auxiliary valves will close when the difference in theoretical current produced by the available oxygen and the actual load demand drops below one or more preselected values.

While Beal discloses a method to increase oxygen supply when load demand increases, Beal does not disclose a method to decrease the oxygen supply to the fuel cell when load demand decreases so as to provide moisture control by limiting an excess amount of dry air or high humidity air to prevent drying out or flooding. Neither does Beal disclose recirculating the reactant air utilized by the cathode to provide moisture control.

U.S. Pat. No. 4,913,983 to Cheiky discloses a metal-air battery power supply to which the air flow is varied by a variable speed fan. The metal-air battery cells are enclosed in an air tight chamber which has a baffle that is movable in front of the air inlet and air outlet to seal off the container when the power supply is not in use. When the power is turned on, the air baffle is moved to permit an air flow into the air inlet that is exhausted through an air outlet. A fan which controls the air flow through the air inlets is run at different speeds depending upon use requirements of the connected computer. Cheiky, however, does not disclose limiting the air available through the air inlet to the air cathode for varying levels of output.

In addition to controlling the flow of reactant air, reactant air has been recirculated in the prior art in an attempt to maintain desired moisture for the reactant air entering a fuel cell. The recirculated reactant air, however, has become depleted of oxygen. In recirculating reactant air, a select amount of the recirculating air must be continually exchanged with ambient air. Because the humidity of the ambient air is not in equilibrium with that of the cells, the difference will tend to dry or flood the cells.

Therefore, there exists a need for a recirculating air manager that minimizes the amount of reactant air exchanged with ambient air to prevent flooding and drying out of metal-air batteries. Also, because the oxygen concentration of the air being recirculated is necessarily less than that of ambient air, the recirculation air manager should be able to ensure that the flow of recirculated air reaches the entire area of all the air cathodes. This ensures that all of the cells receive a sufficient amount of oxygen. Further, the recirculation air manager should be compact and lightweight such that the resulting battery remains relatively light and compact and thus can be easily used in conjunction with portable equipment.

Moreover, the recirculation air manager should be able to operate safely in conjunction with rechargeable metal-air batteries. Rechargeable metal-air batteries, as described above, generate hydrogen gas during recharging, which can be explosive at a high enough concentration in the presence of oxygen. In non-recirculating or one pass air managers, the hydrogen gas is not a problem because it is immediately exhausted with the reactant air. However if a recirculating air manager were to be used in conjunction with rechargeable metal-air batteries, the bulk of the hydrogen and oxygen gas generated from recharging would stay in the battery housing. Therefore, there exists a need for a recirculation air manager that can prevent the collection of the hydrogen gas generated by rechargeable metal-air batteries.

Specific examples of recirculation air managers are shown by U.S. Pat. No. 3,473,963 to Sanderson and French Patent No. 2,353,142 to Jacquelin. Sanderson discloses a system that provides cooling air and recirculated reactant air for a hydrogen and oxygen fuel battery. The cooling air is drawn into the battery casing by a large volume fan and blown through cell cooling chambers. On discharge from the cooling chambers, a portion of the used cooling air is mixed with recirculated reactant air and blown through reactant air chambers by a second fan. The proportion of used cooling air to recirculated reactant air is regulated by a plurality of control valves. The hydrogen fuel is piped into the battery from an outside supply.

Because the fuel hydrogen must be piped into the battery from an outside supply, the Sanderson battery is not portable. Further, the Sanderson system is impractical for portable batteries because it requires cooling chambers in addition to reactant air chambers, a plurality of fans, and a plurality of control valves to recirculate reactant air, all of which add considerable weight and bulk to a battery. Thus, the Sanderson system is not feasible for portable batteries which must be extremely light and compact. Moreover, Sanderson is not a rechargeable metal-air battery. Thus, Sanderson does not alleviate the problems discussed above.

French Patent No. 2,353,142 to Jacquelin discloses an air supply system for a zinc-air electrochemical generator that provides a recirculating path for the air used by the cell. The air manager is designed to avoid local accumulations of carbonate deposits and to vary the output of the cells by varying the amount of the incoming air (oxygen). Jacquelin discloses three modes of operation: maximum mode, slow motion mode, and a predetermined functioning mode. During the maximum mode of operation air is admitted from the atmosphere across the cathode and then exhausted through an outlet. During the maximum mode of operation, the air is not recirculated. A turbo exhauster is provided to ensure circulation of the air when air is being exhausted to the atmosphere. Operation during the maximum mode with no control to compensate for the relative humidity of the air is subject to the problems discussed above with flooding and drying out. During slow motion mode, no ambient air is admitted nor is any air exhausted, thus the oxygen supply is rapidly depleted from the air. This results in a low or slow mode of operation. During the predetermined functioning mode, fresh air is mixed with the air in proportions set by a mixing valve. The Jacquelin invention proposes to maintain a constant flow of gas on the electrodes to assure a good distribution of residual carbon dioxide on the entire surface of the electrodes. The zinc fuel is piped into the battery from an outside supply.

Because the zinc must be piped into the battery from an outside supply, the Jacquelin battery is also not portable. The Jacquelin battery is also not rechargeable. In addition, no method is provided to supply and vary air flow to meet varying load demands while reducing the effects of flooding or drying out. Furthermore, the air is supplied to an enclosed space containing a series of cells as well as pipes carrying the anode solution. Since all components of the cell are exposed to the air flow, one would expect cooling requirements to interfere with control of the air for the purpose of supplying oxygen, because often more air is required for cooling than is needed for the electro-chemical reaction. Thus, Jacquelin does not alleviate the problems discussed above.

Thus, there exists a need for a recirculating air manager that minimizes the amount of reactant air exchanged with ambient air to prevent flooding and drying out of metal-air batteries. Furthermore, there exists a need for a recirculation air manager for a portable rechargeable metal-air battery that circulates reactant air to the entire area of all the air cathodes and which prevents the accumulation of hydrogen gas on recharge.

SUMMARY OF THE INVENTION

The present invention provides a better solution to solving the problems in the art described above by providing an improved air manager for metal-air batteries. The air manager recirculates reactant air in a battery and exchanges only a minimal amount of recirculated air for ambient air that is necessary to maintain a sufficient oxygen concentration in the battery. In the air manager, the reactant air is recirculated in an air pathway defined to provide the entire area of all the air cathodes with reactant air. A catalyst element may be provided in the air manager to convert the hydrogen gas generated during the recharge of a metal-air battery to water vapor. The air manager is nevertheless compact and lightweight so that the resulting battery is portable.

Generally described, one aspect of the present invention meters the amount of ambient air entering in the flow of reactant air to maintain a selected current output. The air manager system optimizes the use of ambient air and reactant air utilized by a metal-air cell by recirculating the reactant air and admitting only a sufficient amount of oxygen from the ambient air to generate the necessary output for the battery, thus reducing the problems of flooding and drying out.

A monitor is provided to determine whether an optimum air supply is available to the metal-air cell. A signal generating circuit is responsive to the current drawn, as measured by a current monitoring circuit, to provide a first signal indicative of an insufficient supply of oxygen to the cell and to provide a second signal indicative of a need for restriction of the air supply to the metal-air cell so as to protect the cell from an excessive supply of air. The air supply adjustment helps to provide further humidity control. An indicator may be provided to indicate an insufficient supply or need for restriction of air to the cell in response to the first or second signal, respectively. The indicator may be a visual display, an audible tone, or a voice message.

The air inlet of the air manager system is set initially to a predetermined position based upon the status of the load to control the amount of oxygen supplied to the cell. The amount of oxygen admitted may be increased in response to the first signal by stepping open the air inlet based upon the load demand. The amount of oxygen admitted may be increased or decreased by setting the air inlet to a different predetermined position whenever the type of load applied is changed. Also, the amount of oxygen may be decreased after the air inlet valve opens wider than a predetermined setting for a predetermined time. In another embodiment of the oxygen monitor, an oxygen control circuit responds to the current drawn by the load by opening the air inlet for a predetermined time to provide air to the metal-air cell when the current is insufficient to meet load demand.

In another embodiment for use with a load having a plurality of modes of operation, the air inlet is operated in response to the mode of operation of the load. The air inlet is adjustable for admitting ambient air into a flow of recirculating reactant air. The mode of operation is monitored by an output control means connected to the load.

A humidifier may also be incorporated into the recirculating pathway to humidify the recirculated reactant air. The humidifier is operative in response to a humidity monitor which monitors the humidity of the recirculating air. Alternately, the humidity monitor may be used to selectively direct the air flow through a bypass channel in order to prevent the air from going through the humidifying pathway.

An oxygen generator may also be provided to deliver oxygen to the pathway as needed by the cathode instead of oxygen from the ambient air. An outlet for exhausting a controlled amount of air corresponding to an amount of new air admitted is also provided.

In order to ensure that the air flow reacts with the entire surface area of the cathode, the direction of the air flow may be changed by a plurality of baffles incorporated into the pathway of the reactant air. The baffles used for changing the direction of the flow of the reactant air may define a serpentine path across the surface of the cathode covering essentially all points of the surface. The invention preferably provides a cathode plenum having an inlet and outlet and a plurality of baffles defining a nonlinear path for the air to flow from the inlet to the outlet.

Another aspect of the invention comprises an arrangement of one or more cell stacks within a housing. The cell stacks are each comprised of a plurality of metal-air cells that each have a cell casing and an air cathode assembly. The cells are positioned at spaced apart levels by one or more spacer barriers that extend between the air cathode assembly of each cell and a facing wall. The facing wall, depending on the position of a cell in its cell stack, is either a portion of the housing or the cell casing of an adjacent cell.

An air pathway for providing reactant air to the cells is provided. The air pathway comprises a plurality of channels and an air plenum. The channels are defined by the spacer barriers and the facing walls. The channels each have an air inlet end and an air outlet end opened to the air plenum.

A flow of air is directed throughout the channels from the air inlet end to the air outlet end by an air moving device. As the air flows through the channels it becomes depleted of oxygen by the operation of the cells. An air exchange opening is provided in the pathway for exchanging a select amount of the depleted air with ambient air from outside of the housing. The amount exchanged is based on the oxygen depleted by the operation of the cells. The non-exchanged depleted air is recirculated with the admitted ambient air by the air moving device.

In one embodiment of the second aspect of the present invention, the spacer barriers are positioned such that, at each level, air flows from the air inlet end of the channel in a first direction adjacent to one portion of the air cathode assembly and then in an opposite direction adjacent to the remaining portion of the air cathode assembly, and then to the air outlet end.

In a second embodiment of the second aspect of the present invention, the air inlet ends of the channels are opened to the air plenum on a first side of the cell stack arrangement and the air outlet ends are open to the air plenum on a second opposite side of the cell stack arrangement. Thus the air flows through the channels of the cell stacks from the first side to the opposite second side.

According to a third aspect of the invention, a catalyst element is provided in the path of the air flow for catalyzing the recombination of the hydrogen and oxygen gas generated by a rechargeable metal-air battery.

Thus, it is an object of the present invention to provide an improved air manager for metal-air batteries.

It is further an object of the present invention to provide an air manager system for a metal-air cell which provides an effective use of reactant and ambient air.

It is a further object of the present invention to admit ambient air in a manner to approximately replace oxygen removed by the cell.

It is a further an object of the present invention to recirculate reactant air across the cathode in a manner which maintains a selected current output density.

It is a further object of the present invention to provide an oxygen supply control circuit which increases or decreases the oxygen available to the metal-air cell based on load demand so as to provide moisture control.

It is a further object of the present invention to maintain the oxygen supply to a metal-air cell at an optimum setting based on the particular load status applied to the cell.

It is another object of the present invention to provide an improved recirculating air manager for metal-air batteries.

It is another object of the present invention to provide a recirculating air manager for metal-air batteries that exchanges only the minimal amount of recirculated air for ambient air that is necessary to maintain a sufficient oxygen concentration in the battery.

It is another object of the present invention to provide a recirculating air manager for metal-air batteries with an air pathway defined to provide the entire area of all the air cathodes with reactant air.

It is another object of the present invention to provide a recirculating air manager for rechargeable metal-air batteries.

It is yet another object of the present invention to provide a recirculating air manager for rechargeable metal-air batteries with a catalyst element that catalyzes the recombination of the hydrogen and oxygen gases generated by recharging.

It is yet another object of the present invention to provide a recirculating air manager for portable metal-air batteries.

It is yet further another object of the present invention to provide a recirculating air manager for portable metal-air batteries that is compact and lightweight.

Further objects, features and advantages of the present invention will become apparent upon reviewing the following description of preferred embodiments of the invention, when taken in conjunction with the drawings and appended claims.

BRIEF DESCRIPTION OF THE DRAWINGS

FIG. 2 is a diagrammatic view of an alternate embodiment of the first aspect of the present invention which incorporates a humidifier into the air manager system.

FIG. 3 shows a top view of the cathode plenum of the first aspect of the present invention shown in FIGS. 1 and 2.

FIG. 4 shows a flow diagram which illustrates an embodiment of automatically controlled air valves.

FIG. 5 shows a flow diagram which illustrates another embodiment of automatically controlled air valves.

FIG. 6 is an exploded perspective view of a metal-air battery containing an air manager in accordance with the second aspect of the present invention FIG. 7 is a perspective view from a different angle of the battery housing of the metal-air battery of FIG. 6 with cell stacks that incorporate a first channel embodiment in connection with the air manager of the second aspect of the present invention.

FIG. 8 is a front view of the control panel of the metal-air battery of FIG. 6.

FIG. 9 is an exploded view of the control section housing of the metal-air battery of FIG. 6 showing the control panel receptors and wiring.

FIG. 10 is a cross sectional view of a cell of the metal-air battery of FIG. 6 showing the air cathode assembly, the anode and a hydrogen vent.

FIG. 11 is a diagrammatic top view of the interior of the metal-air battery of FIG. 6 showing the position of the spacer barriers in connection with the first channel embodiment of the second aspect of the present invention.

FIG. 12 is a perspective view of a cell stack of the metal-air battery of FIG. 6 in connection with the first channel embodiment of the second aspect of the present invention showing the positioning of the spacer barriers between the air cathode assemblies and the cell casings or the cell housing.

FIG. 13 is a diagrammatic view of the metal-air battery of FIG. 6 utilizing a second channel embodiment showing the positioning of the spacer barriers between the air cathode assemblies and the cell casings or the cell housing.

DETAILED DESCRIPTION

Figure 1:
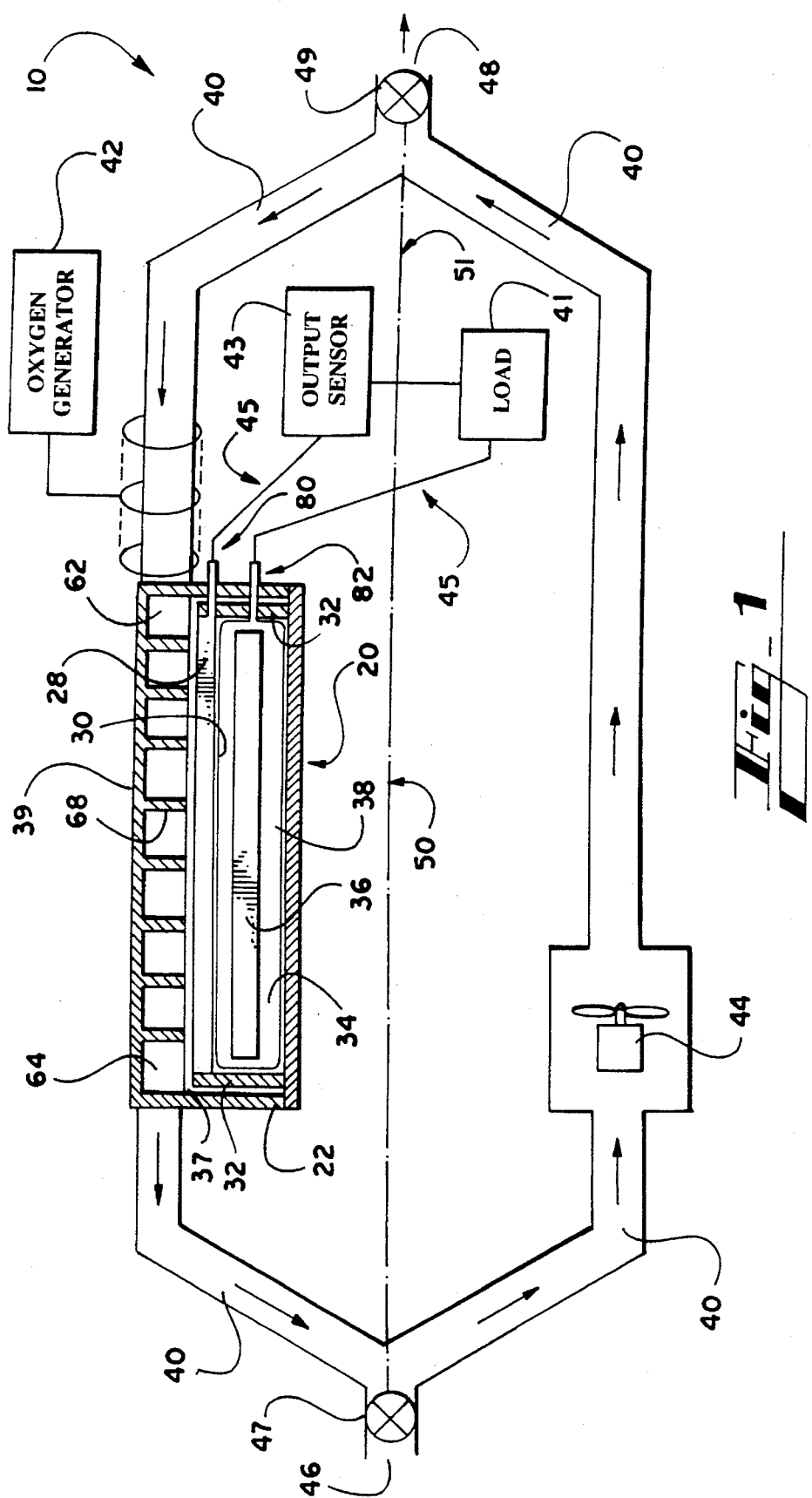
FIG. 1 shows a diagrammatic view of an air manager system of the first aspect of the present invention, associated with a metal-air cell, shown in cross-section.

Referring in more detail to the drawing, in which like numerals refer to like parts throughout the several views, FIGS. 1 and 2 show an air manager system 10, embodying the first aspect of the present invention, for a secondary metal-air cell 20 incorporating a bi-functional air electrode. Disposed within a cell case 22 are: a cathode 28 supported by a rectangular support 32, an anode 36, and an electrolyte 34. A cathode plenum 39 in which reactant air circulates may be provided over the cathode 28. Within the cell case 22 of metal-air cell 20, the rectangular support 32 fits about the periphery of the anode 36 and the cathode 28. Suitable air cathodes are disclosed in U.S. Pat. Nos. 4,354,958; 4,518,705; 4,615,954; 4,927,514; 4,444,852. Air passes to the cathode 28 through a gas permeable membrane 37. A suitable anode 36 is a wrapped zinc anode such as that disclosed in U.S. Pat. No. 4,957,826 the disclosure of which is expressly incorporated herein by reference. The anode 36 is wrapped in a sheet 38 of absorbent, wettable, oxidation-resistant woven or nonwoven cloth, such as cotton, rayon, modified CMC or wettable plastic fibers. This sheet 38 is soaked in a suitable electrolyte 34 such as an aqueous base including a group I metal hydroxide such as KOH, LiOH, NaOH, CsOH, or the like, as disclosed in U.S. Pat. No. 4,957,826.

As shown in FIGS. 1 and 2, the air manager system 10 made according to the preferred embodiment of the first aspect of the present invention comprises a recirculating pathway 40 for the reactant air of the metal-air cell 20. The cathode plenum 39 is included in the recirculating pathway 40 so as to define a closed path for the recirculated air. The recirculating air flow to the cathode is separate from a coolant air flow that is adjacent to the anode. The recirculating pathway 40 may incorporate an oxygen generator 42 or other source of relatively pure oxygen adjacent to the metal-air cell 20 to provide an alternate source of oxygen. A fan 44 is positioned into the recirculating pathway 40 to facilitate the recirculation of the reactant air and to increase the turbulence of the reactant air. Preferably, the flow rate of air through the pathway is greater than 0.5 liters per minute. The recirculating pathway 40 has an air inlet 46 and an air outlet 48 through which air flow is controlled by air inlet valve 47 and air outlet valve 49, respectively. The air inlet 46 and air inlet valve 47 admit ambient air into the flow of recirculating reactant air in an amount sufficient only to approximately replace the oxygen removed by the cell from the recirculating reactant air. A proportionate amount of reactant air may be exhausted through air outlet 48 when the air valve 47 is opened. Ambient air is admitted into the flow of reactant air so as to maintain a selected current output. The valves 47 and 48 may be closed after a sufficient amount of air has been admitted.

The flooding and drying out problems, discussed above, may be controlled by recirculating and mixing the ambient and the reactant air through the recirculating pathway 40.

The air outlet valve 48 is closed initially and thus the initial supply of oxygen to the cell is obtained from the ambient air. After a sufficient amount of ambient air is admitted to allow battery operation, the air inlet valve 46 is closed and the air is circulated through the recirculating pathway 40. The fan 44 increases the rate of flow of circulating air at a rate corresponding to load demand.

An output sensor circuit 43, which comprises a conventional current sensor and a microprocessor (not shown), monitors the current to determine when an insufficient current is being drawn from the metal-air cell 20 to meet a predetermined load demand. The current sensor's output is analyzed by the microprocessor. Also, the microprocessor resets the air valves periodically to assure that an excessive amount of air is not being supplied to the metal-air cell in response to the output sensor circuit 43. The sensor circuit 43 is connected along the load circuit 45 to monitor the current drawn by the load 41. The load circuit 45 is connected at one end to a cathode terminal 80 and at another end to the anode terminal 82.

The sensor circuit 43 provides an output signal indicating when the level of current being drawn from the metal-air cell 20 indicates that an adjustment of air is appropriate. For loads that have varying modes of operation, the amount of current necessary for a particular mode of operation will vary. The output sensor circuit 43, in particular the microprocessor, may monitor the load status to determine the mode of operation and upon determining the mode of operation, may compare the minimum amount of current required for that particular status with the actual current being drawn. For example, if the load is a computer, the status or condition of the various integrated circuits connected to the microprocessor may be determined by reading the status registers of the integrated circuit device. Depending on the status or mode of operation of the device, the air available to produce the required current may be adjusted. If the current being drawn for the particular status is below the minimum current required for that status then insufficient current draw is indicated. Similarly, if the current being drawn for the particular status is sufficient but more air than needed is being provided to the metal-air cell 20 then a signal indicating a need for restriction of air flow is provided. The signals generated that indicate insufficient current or a need for restriction of air flow may be input to a responsive circuit, such as air valve controllers or a display.

The current sensor utilized in this embodiment of the present invention preferably senses the magnetic field around the conductor connected to the load to determine the amount of current flowing through the conductor. Those skilled in the art will appreciate that it is possible to measure the current drawn by other means. Various types of current sensors, such as transformer type sensors or Hall-effect devices, may be used to measure the magnetic field surrounding a conductor. In a transformer type sensor, the conductor acts as the primary electromagnetic element of a transformer, and turns a wire around the core act as a secondary electromagnetic element. A current proportional to the current in the primary conductor is induced into the secondary element. In the Hall-effect device, a semiconductor sensor is inserted into a narrow slit in a core. This semiconductor sensor detects the existence and strength of the magnetic field induced by the conductor, from which the proportional output voltage may be generated. The output voltage signal which is proportionate to the current flowing in the conductor may be measured, stored, and analyzed in the microprocessor.

If manual valves 47 and 49 are being utilized, the responsive circuit may comprise a visual display that indicates an insufficient amount of oxygen or a need for restriction of air supply by lighting appropriate LED's or by inputting the signal to a liquid crystal display (LCD). Also, the signal indicating an insufficient amount of oxygen or a need for restriction of air flow may be input into a conventional tone generator or may be input into a conventional sound or voice recording/playing chip to generate a predetermined message in response to the supply of air.

Referring to FIG. 4 and FIG. 5, flow diagrams are shown to illustrate embodiments of the present invention utilizing air valves that are automatically controlled by the sensor circuit 43. Various modes of operation may be utilized by a given load. For each of these modes (load status), a minimum or optimum current draw may be determined and for each load status an optimum air valve setting, designed to produce the appropriate current output, may be determined. For each load status, a minimum or optimum current draw for that load status may be stored in a memory table located within the memory associated with the load or a memory device associated with the sensor circuit 43. These predetermined optimum values may be utilized by the present invention to adjust the amount of air available to the cell so that an appropriate current can be generated to meet load demand. The optimum valve settings may also be stored for each load status.

Referring in more detail to FIG. 4, an embodiment of the present invention is shown that maintains a steady state oxygen flow to the metal-air cell such that the air valves are automatically adjusted when load demand changes. At step 401, the sensor circuit 43 reads the present load status. Initially the load status is set to equal the load status requiring the least current before the first iteration of the flow diagram loop. The load status is then evaluated, at step 402, to determine whether there has been a change in load status since the previous load status determination. If the load status has changed, a signal is provided to adjust the air valves at step 403 to equal the optimum setting for that load status in order that the appropriate amount of air is available to the metal-air cell 20 to produce the appropriate current. This adjustment may either increase or decrease the oxygen supply, depending on the new load status. At 404, a timer, as discussed below, is initialized for each status change. At step 405, the actual current being drawn by the load, as measured by sensor 43, is evaluated, then at step 406, the measured current is compared to the minimum current required for the particular load status. If the actual current being drawn is less than the minimum required for that load status, then a signal is provided to step open the air valves by a predetermined increment at step 407. Steps 401, 402, 405 and 406 are then repeated in order to determine if the air valves have been opened to a sufficient position so that current demand is met. At step 406, if the current draw is less than the minimum required for the load status then the air valves are stepped opened by a further predetermined increment at step 407. However, if the current draw is not less than (equals or exceeds) the minimum required for the particular load status as determined at step 406 then at step 408 the air valves are evaluated to determine if the valves are at the stored optimum setting. If the valve positions are at the optimum settings for the particular load status then the monitoring steps discussed above are repeated. However, at step 408, it is possible that the air valves have been stepped open wider than the optimum setting for the particular load status in order, for example, to compensate for air which has a lower oxygen content than optimum conditions. Such situation might occur if smoke was in the area for period of time.

To deal with a situation in which the current drawn by the load is sufficient but the valves are opened beyond the optimum position for the load status, such as when the oxygen supply in the air is low, a timing loop is provided to return the valve setting to its optimum position at the expiration of a preset time. If the air valves were allowed to remain open beyond the optimum setting for the particular load status, more air than needed would be provided to the metal-air cell 20 when the oxygen content of the air returned to its usual make-up. At step 409, if the timer is at its initial setting, indicating that the timer has not been started for the particular load status, then the timer is started at step 410. At step 411 if the timer has not reached its limit then the evaluation process begins again at step 401. However, if the timer has reached its limit at step 411 then at step 412 the timer is reset to its initial setting. A signal is then provided to decrease the air valve settings to the optimum positions at step 413 after the expiration of the time limit. By providing a method to decrease or restrict the air provided to the metal-air cell and depending on whether the air has a high humidity or low humidity, the problems discussed above concerning flooding and drying out of the cell are ameliorated.

Referring in detail to FIG. 5, another embodiment of the present invention which also utilizes automatically controlled air valves is shown. The embodiment shown in FIG. 5 is not as complex as the embodiment depicted in FIG. 4. At step 501, the load status is determined, then at step 502 the actual current draw of the load is determined. At step 503, if the current draw is less than the minimum required for the load status then the microprocessor generates a signal to open the air valves at step 504 for a predetermined time, after which time the air valves close. By closing the valves after sufficient air has been admitted, flooding and drying out is controlled. The air is utilized by the metal-air cell 20 to produce current sufficient to meet load demand. The program returns to step 501 to check load status and again checks current draw at step 502. When the oxygen within this closed system is depleted to an extent that the actual current being drawn is less than the minimum required for the load status then the valves are opened again at step 504 for the predetermined time limit. The predetermined time limit for opening the valves may be the same for each load status or may vary according to the load status. With this system, the load will be put under momentary strain after a period of time even if the load status stays the same because the oxygen within the closed system will be depleted, thus causing the actual current being drawn to fall below the minimum required until the air valves are opened again. The time period for which the current falls below optimum will be brief as the air valves are immediately opened.

The microprocessor associated with the load evaluates the output sensor, the load status memory locations, and the air valves to generate or receive the appropriate output or input signals as described above. Appropriate software may be written to implement the logic shown in FIG. 4 and FIG. 5. The timing loops provided for in the logic may be implemented with software, by using an internal timer on the microprocessor, or by using common timing devices that are utilized by those skilled in the art.

When insufficient current draw is indicated, air inlet valve 47 may be manually opened or may be automatically opened by a solenoid valve controller (not shown) in the sensor circuit 43 via control line 50 in a conventional manner. Likewise, when indicated, the air outlet valve 47 may be manually opened, or automatically opened via control line 51 to exhaust air as discussed above. After a sufficient amount of air has been admitted, various modes of operation may be utilized. The modes of operation can vary from low current output to high current output depending both upon the amount of oxygen admitted to the air manager 10 and the rate at which the fan 44 is operated. If the admitted air has a high oxygen content (by use of an oxygen generator, or filtering other components from the air, for example) and the fan 44 is operated at high speed, such as 500 cubic inches per minute, then a maximum mode of operation may be utilized. Similarly, intermediate and low modes of operation may be utilized if the oxygen content of the air is lower or the fan speed is lowered.

Those skilled in the art will understand that the time delays in FIGS. 4 and 5, and the incremental increase in the valve openings called for in FIG. 5 can be determined and optimized based on the nature of the load.

Alternately, the valves 46 and 47 may be set to provide a selected constant rate of make-up ambient air, which would provide a generally steady state of output from the cell while minimizing humidity imbalance.

Instead of admitting ambient air when oxygen is depleted, the oxygen generator 42 may also supply oxygen sufficient to meet load demand. When the ambient air has a high relative humidity, a supply of oxygen from the generator 42 serves an important function in helping to prevent battery flooding. By using oxygen from the generator 42 when oxygen is depleted from the reactant air, the relative humidity within the air manager system 10 may be more readily equalized to the vapor pressure of the water in the electrolyte 34 within the metal-air cell 20. Various modes of operation may be utilized when using oxygen from the generator 42 in a similar manner as discussed above.

Those skilled in the art will understand that controlling the speed of air flow across the cathode 28 affects current output for the load connected to a metal-air cell 20 as taught by U.S. Pat. No. 4,913,983. Adjusting the rate of the air flow across the cathode 28 can be used along with ambient air control as described above. FIG. 2 shows an alternative embodiment of the present invention, which provides greater humidity control. A humidifier 52 is incorporated into the recirculating pathway 40 to humidify the recirculated reactant air when the vapor pressure in the air is low. The humidifier 52 is operative in response to a humidity monitor 53 which monitors the humidity of the reactant air. A bypass channel 54 extends around the humidifier 52 to provide an alternate route for sufficiently humidified recirculating air. A solenoid valve 56, operative in response to the humidity monitor 53, may be used to control the proportions of recirculating air flow through the humidifier 52 and/or bypass channel 54. The humidifier may consist of any common type of humidifier, such as a moisturizing pad, or may be variable as to the rate at which humidity is added to the air.

As discussed above, the relative humidity of the ambient air can affect cell performance and useful life. The humidifier 52 provides greater control over the humidity of the recirculating reactant air. The solenoid valve 56 may be used to selectively direct proportions of air flow, depending on the humidity of the air, through either channel to prevent drying out or flooding of the metal-air cell 20. By monitoring the relative humidity of the air being utilized by the metal-air cell 20, the humidity monitor 53 may optimally control the output, if variable, of the humidifier 52 by a control line 57. Similarly, the humidity monitor 53 may optimally control the proportions of air directed through the humidifier 52 or the bypass channel 54 by a control line 59.

A microprocessor (not shown) associated with the humidity monitor 53 may be conventionally programmed to compare a stored value representing optimum humidity in the recirculating air with the actual measured humidity so that the microprocessor may utilize a solenoid valve 56 via control line 59 to proportionately direct the air flow through the appropriate channels. If, for example, the relative humidity of the mixed circulating air is less than the vapor pressure in the metal-air cell 20 the air flow is directed through the humidifier 52 until the appropriate equilibrium condition for the metal-air cell 20 is reached. After the equilibrium condition is reached, the recirculating air is directed through the bypass channel 54. If the relative humidity of the admitted ambient air is slightly greater than the optimum humidity for the metal-air cell 20, the air flow is directed through the bypass channel 54. If the relative humidity of the ambient air is great enough to cause flooding of the metal-air cell 20, then portions of the ambient air may be mixed with the oxygen from oxygen generator 42 until an equilibrium condition is established and the mixture may be directed through the bypass channel 54. Simultaneously directing portions of the air flow through both the humidifier 52 and bypass channel 54 may be utilized to accomplish equilibrium. The recirculating pathway 40, the humidifier 52, the bypass channel 54, and the humidity monitor 53 act in conjunction to provide optimum operating conditions for the air utilized by the metal-air cell 20. The embodiment of FIG. 2 otherwise incorporates the functional aspects of the invention referenced in FIG. 1 described earlier.

Thus, it will be seen that the problems concerning flooding or drying out of a metal-air cell due to exposure to new ambient air are controlled in the present invention as the reactant air is recirculated and the humidity of the air is controlled.

As discussed above, prior methods of providing air across the cathode of a metal-air cell may fail to utilize effectively the entire surface of the cathode. Cathode plenums generally provide plenum inlets and outlets for air to pass across the cathode. Using only an inlet and outlet to control air flow across the cathode may introduce the problem of channeling where the air flows directly from plenum inlet to outlet without utilizing the entire surface area of the cathode, and, as the oxygen is depleted, pockets of oxygen deficient air are created across the cathode. Referring to FIG. 3, the cathode plenum 39 is shown with a plenum air inlet 62 and a plenum air outlet 64. A nonlinear pathway 66 from the plenum air inlet 62 to the plenum air outlet 64, represented by arrows in FIG. 3, helps to provide a more efficient air flow across the entire surface of the cathode 28 thus more efficiently produces current output from the metal-air cell 20 therefore less new ambient air needed. By utilizing a nonlinear pathway across the cathode, turbulence is created which helps to eliminate the problems associated with air channeling. Baffles 68 may define the nonlinear pathway 66 from the plenum air inlet 62 to the plenum air outlet 64. The problem of channeling is overcome by incorporating a nonlinear pathway 66 from the plenum air inlet 62 to the plenum air outlet 64. The nonlinear pathway 66 preferably forms a serpentine path. Preferably, the cross sectional width of the inlet 62 parallel to the surface of the cathode 28 is smaller than the cathode surface breadth which is transverse to the air-flow pathway 66 at the inlet.

The cathode plenum 39 may be incorporated into a metal-air cell 20 as shown in the air manager systems of FIGS. 2 and 3. By utilizing the cathode plenum 39 and the recirculating pathway 40 shown in FIGS. 2 and 3, the output efficiency from a given supply of air may be optimized in the first aspect of the present invention without increasing the risk of flooding or drying out.

From the foregoing, it can be seen that the first aspect of the present invention provides an air manager system which optimally uses a given amount of reactant and ambient air to produce a desired current output while reducing the effects of drying out or flooding.

In accordance with the second aspect of the present invention, FIGS. 6 and 7 show a metal-air battery pack 102 comprising a two part housing 104 which consists of a control section 104a and a cell stack section 104b. The housing 104 is preferably made of molded plastic.

As shown by FIG. 7, the cell stack section 104b of the housing encloses a plurality of battery cells 162, which are arranged in a plurality of cell stacks 160. While the number of cell stacks 160 and the number of battery cells 162 in each stack may vary depending on the size and shape of the battery pack 102 as well as the number of battery cells 162 needed to power the battery's load, the battery pack 102 of the preferred embodiment comprises three cell stacks 160 with four cells 162 each.

A front stack 160a, a center stack 160b and a rear stack 160c are positioned adjacent to each other. The cell stacks 160 are attached to one another by a bead of hot melt adhesive to prevent air flowing vertically between them. It will be understood by those skilled in the art that alternative materials such as caulk or sealant may be used to prevent vertical air flow between the cell stacks 160. Additionally, the parts of the cells at each level may by formed together to prevent said vertical air flow.

The cell stacks 160 are secured in the cell stack section 104b of the housing by a front wall 114, which extends across a portion of the exposed face of cell stack 160a. The cell stacks 160 are narrower than cell stack section 104b of the housing, leaving a space 164a and a space 164b running along the sides of the cell stacks 160.

Shown in detail in FIGS. 8 and 9, the control section 104a of the housing includes extended sides 106 which overlap indentations 108 of the cell stack section 104b. A pair of thumbscrews 110 are mounted in recesses 109 in the bottom of the control section 104a for securing the control section 104a to the cell stack section 104b. The thumbscrews 110 are supported by thumbscrew covers 111 from which the thumbscrews 110 extend rearward toward a pair of threaded retainers 112. Where they enter the housing 104, the thumbscrews 110 carry washer-like seals (not shown) to prevent air flow around the thumbscrews 110. When the thumbscrews 110 are secured in the threaded retainers 112, the housing sections form an essentially air tight seal.

The control section of the housing 104a includes a control panel 116 which holds a pair of power supply output jacks 118 and a recharge connector 120. The power supply output jacks and the recharge connector are connected to the battery cells 162 through a printed circuit board 122, a printed circuit board connector 124, wiring 126 and a control panel receptor 128.

A plurality of light emitting diodes 130 and a test actuator 134 are surface mounted on the printed circuit board 122. These components extend through appropriate openings formed in the control panel 116. The test actuator 134 may be actuated by depressing a test button 132 that extends from the actuator 134 through an opening in the control panel 116. The light emitting diodes 130 provide an indication of the charge level of the battery pack 102 when the test actuator 134 is actuated. Alarms as well as other status indicators may be provided on the printed circuit board 122. For example, a battery leakage alarm may be provided as disclosed in U.S. Pat. No. 5,399,449. It will be understood by those skilled in the art that the printed circuit board 122 may include electronics which permit the recharging process to be controlled. However, such electronics are not part of the present invention, which provides air management benefits regardless of the particular nature of such electronics.

An air exchange opening 140 is provided in the control section housing 104a for admitting ambient air into the housing 104. The air exchange opening 140 is formed in an air inlet projection 152. Preferably, the air exchange opening 140 is an elongate rectangular slot having an area from about 0.05 square inch to about 0.15 square inch. The slot 140 preferably is 0.12 inch wide by 0.8 inch long, and preferably has an area of 0.096 square inch. In front of the air exchange opening 140, a decorative grill 144 is formed of spaced vertical posts which allow the ambient air to flow through the grill.

A switch actuator opening 146 is formed in the control panel 116 for receiving a front protrusion 148 of a switch actuator 138 which also serves as an air door. The actuator 138 slides in a track (not shown) defined in the rear surface of the face plate. An integrally formed air door projection 150 extends rearwardly from the air door 138 and forms a generally triangular cross section. On a surface of the projection 150 facing the air inlet projection 152, an air door gasket 154 is fixed. When the air door 138 slides toward the projection 152, the gasket 154 presses against the air exchange opening 140 and seals it. The actuator/air door 138 also defines a rearwardly extending protrusion 156 for actuating an electric switch 136 as described below.

The switch 136 is mounted on the printed circuit board 122 at the edge closest to the actuator 138, so that the switch 136 is mechanically activated by the protrusion 156 when the actuator 138 is slid toward the printed circuit board 122. This turns on an air moving device 142 via conventional circuitry (not shown) as the air exchange opening 140 is uncovered.

The air moving device 142 is preferably a fan and will be so referred to hereafter. Thus, the term "fan" used herein is intended to mean any device used to move air. The fan 142 circulates air within the housing 104 to provide reactant air for the battery cells 162. The rated capacity of the fan is preferably about 6.3 cu. ft. per minute at zero static pressure. The fan 142 may be positioned within the housing 104, as described below, or it may be mounted on the outside of the housing 104. In the latter case, the fan 142 would draw air from the housing 104 and then return it to the housing 104. The fan 142 may be mounted in any convenient manner.

Returning to FIG. 6, the fan 142 is disposed in an air plenum 158 formed between the air exchange opening 140 and the battery cells 162. Preferably, the fan 142 is positioned so that the flow of air from the fan 142 is parallel to the control panel 116, which is parallel to the front of the battery cells 162. The air exchange opening 140 is disposed on the high pressure side of the fan 142.

As air from the fan 142 flows past the air exchange opening 140, a portion of the air is diffused outside the housing through the air exchange opening 140. At the same time, a limited amount of ambient air is diffused into the housing through the air exchange opening 140 as described in U.S. patent application Ser. No. 08/077,827, now U.S. Pat. No. 5,356,729, which is incorporated herein by reference.

Depicted in FIG. 10 are the various components of the metal-air battery cell 162. A cell case 166 includes a case body 168 consisting of a cell bottom 169, a cell lid 174 and an upwardly extending peripheral side wall 171. An air cathode assembly 175 is disposed within the cell case body 168, along the bottom of the cell case body 168.

The air cathode assembly 175 comprises a plurality of openings 170 along the cell bottom 169 and an air cathode 172 exposed to the atmosphere via the openings 170. A gas-permeable, hydrophobic membrane 173 extends along the interior of the cell case 166 between the cathode 172 and the openings 170 and along the sidewall 171 to prevent electrolyte leakage and to reduce the amount of moisture exiting the cell 162, while allowing air to pass through for reaction at the cathode 172.

A cathode support 178 secures the cathode 172 in position in the cell case body 168 as well as containing and supporting an anode screen 180, an absorbent separator material 181 and an electrolyte 182. The cell lid 174 encloses the cell body 168 and meets the body 168 along a seam 184. An electrode lead 183 extends from the cathode 172 along the side wall 171 and through the seam 184, between the lid 174 and the cell side wall 171. The aqueous electrolyte 182 partially fills the cell case 166 thereby defining a liquid volume within the cell case 166. The remaining non-solid volume defines a gas volume within the cell case 166 depending upon the volume of the cell case 166 filled by the aqueous electrolyte 182.

Zinc is the preferred metal for the anode 180 because of its availability, energy density, safety, and relatively low cost. KOH is the preferred electrolyte 182. The preferred cathode is described in U.S. Pat. No. 5,306,579, which is incorporated herein by reference.

One or more vent systems 190 are provided in the cell lid 174 for exhausting excess gas generated by the cell 162 from within the cell case 166 to prevent excess pressure from building within the cell case 166. Each vent system 190 comprises a small gas exit hole 191, a recess 192 within the cell case section, a gas-permeable, hydrophobic membrane 193, a porous gas diffuser 194 and a gas-permeable, hydrophobic membrane 195. The gas exit hole 191 extends through the cell case to provide a means for exhausting gases generated during operation of the metal-air cell 162. Within the recess 192, the gas-permeable hydrophobic membrane 193 is attached to the surface of the recess 192 such that the membrane 193 covers the gas exit hole 191. The recess 192 is preferably circular in shape. The gas diffuser 194 has a plurality of pores and is placed adjacent to the membrane 193 within the recess 192 so as to cover the gas exit hole 191. The other membrane 195 may be attached to the interior surface of the cell case 166 so as to cover the recess 192 and the gas diffuser 194 which is fitted within the recess 192. The vent systems 190 are each constructed as disclosed by U.S. patent application Ser. No. 08/071,844, which is incorporated herein by reference.

As shown by FIG. 12, the cells 162 are disposed with the cathode assemblies facing the bottom of the cell stack housing 104b. The cells 162 are positioned at spaced apart levels by sets of spacer barriers 210. The cell nearest the bottom of the housing 162a is separated from the housing by a set of spacer barriers 210a. The next cell 162b is in turn, separated from the cell 162a by a set of spacer barriers 210b. The cell 162c is separated from the cell 162b by a set of spacer barriers 210c and the cell 162d is separated from the cell 162c by a set of spacer barriers 210d. A set of spacer barriers 210e separate the cell 162d from the top of the housing 104.

In one embodiment of the second aspect of the invention, the space 164a adjacent to the cell stacks 160b and 160c is sealed off from the flow of air by a foam barrier 167.

Additionally, the space 164b is completely sealed off from the flow of air by a foam barrier 169. Thus, the entire flow of air is confined to the air pathway which extends across the entire area of all the air cathodes. Therefore, the entire area of all the air cathodes is supplied with reactant air. The part of the space 164a adjacent cell stack 160a forms an extension of the plenum 158.

The cell casing or the housing opposite each cell 162, as the case may be, forms a facing wall, which with the spacer barriers 210 forms a channel 212 between each cell level. Each cell stack 160 thus has five (5) similar channels 212a, 212b, 212c, 212d and 212e at spaced apart vertical levels. The four (4) channels 212a, 212b, 212c and 212d between the cells 162 provide reactant air to the cells 162. The channel 212e above the top cell 162d removes hydrogen gas vented from that cell. Also, in addition to providing reactant air to the cells above them, the channels 212b, 212c and 212d additionally remove hydrogen gas vented by the cells 162a, 162b and 162c, respectively.

The channels 212 each have an air inlet end 214 and an air outlet end 216 that are open to the air plenum 158. Together the air plenum 158 and the channels 212 form an air pathway that is isolated from general circulation in the housing 104.

More specifically, in one embodiment of the present invention (FIGS. 11 and 12), each set of spacer barriers 210 which configures the channel at each level includes a first U-shaped spacer barrier 213 that extends from the front end of the housing 104b across the edges of the cell stacks 160a, 160b and 160c, along the back of the cell stack 160c and then along the opposite side of the cell stacks 160c and 160b. A second L-shaped spacer barrier 215 extends along the interior of the wall 114 from the space 164a to the mid-point of the cell stack 160a and then rearwardly down the middle of the cell stacks 160a, 160b and a portion of 160c.

An air deflector 220 is disposed in the air plenum 158. The deflector 220 extends from a front wall 221 of the plenum to a point which seals against the cell stack 160a when the housing sections 104a and 104b are assembled. The deflector 220 extends vertically to seal against the top and bottom of the interior of the control section 104b of the housing. The air deflector 220 deflects the flow of air from the fan to the air inlet ends 214 of the channels 212. In each channel, the air flows rearwardly from the inlet end 214 along one side of the cell stacks 160, across the back of the cell stack 160c and then forwardly along the other side of the cell stacks 160 to the end of the barrier 213. The air exits the channels into the space 164a and into the plenum 158 next to the fan 142. The flow is shown by the arrows 219.

Another embodiment of the present invention is now described in connection with the same cell configuration as shown in FIG. 6. In this embodiment, shown in FIG. 13, spacer barriers 217 are positioned transversely along the sides of the cell stacks 160 that are parallel to the air plenum 158. The spaces 164 are not sealed in this embodiment but form part of the air plenum.

The flow of air from the fan 142 flows into and along space 164a. In space 164a, a portion of the flow is diverted into the channels 212 of the cell stack 160a. The remaining air flows farther along the space 164a where a further portion is diverted into the channels 212 of the cell stack 160b. The remaining portion of the air flows farther along the space 164a and then through the channels of the cell stack 160c. The air exits the channels 212 of all of the cell stacks 160 into the space 164b where it is drawn back into the air plenum 158. Thus, the entire flow of air is again confined to the air pathway which extends across the entire area of all the air cathodes and supplies that entire area with reactant air.

In either channel configuration, during operation of the cells 162 reactant air is recirculated by the fan 142 from the air plenum 158 through the channels 212 and back to the air plenum 158. The reactant air enters the air inlet ends of the channels 214 and flows through to the air outlet ends 216. As the reactant air flows through the channels 212, it is depleted of oxygen by the operation of the cells 162. The oxygen concentration of the air in the air plenum 158 may be maintained within a range from about 7 percent to about 19 percent. To compensate for the oxygen used, a select amount of the depleted air is exchanged for ambient air through the air exchange opening 140. Only a limited amount of the depleted air is exchanged for ambient air. In a preferred embodiment of the present invention, the air exchange opening 140 is sized so that when it is open, the amount of air exchanged includes diffused oxygen substantially equal to the oxygen depleted by the operation of the cells 162, such that the oxygen concentration of the air in the air plenum 158 optimally is maintained at about 10–12 percent. The rate of incoming diffusion of oxygen to accomplish this is about 3.5 cc/minute/amp/cell. Because of the preferential diffusion of oxygen through the opening 140, less ambient air than the stoichiometric amount may be required to obtain this level of oxygen diffusion.

EXAMPLE

A 12 volt zinc-air battery is positioned generally as shown in FIGS. 6–12. The battery is connected to a load (not shown) drawing an output of about 1 amp at about 12 volts (from about 0.9 to about 1.2 volts per cell). The dimensions of the housing are height 3 inches by width 6.8 inches by depth 11.6 inches. Each cell has the approximate dimensions of height 0.54 inch by width 3 inches by depth 5.3 inches, for a volume of about 8.58 cu. inches. The channels 212 are each about 0.09 inch high. The free space volume within the housing is about 40.9 cu. inches. The exposed area of each of the air cathodes totals about 12.75 square inches, so that in the housing there is about 0.27 cu. in. of free volume per sq. in. of air cathode. The air exchange opening has an area of about 0.096 square inch and permits diffusion of about 42 cc/min. of oxygen. The fan 142 has a rated capacity of about 6.3 cu. ft. per minute at zero static pressure. The capacity during operation is estimated to be about 3 cu. ft. per minute. The battery is positioned in an ambient environment having a relative humidity level of 30%. During operation, an oxygen concentration of about 10% is maintained in the channels 212 and the plenum 158. The water loss from the each cell is about 0.01 to 0.15 grams per hour.

The expected life of a battery according to the foregoing Example before dry out exceeds 800 hours. A similar buffering effect on water gain in a high relative humidity environment is expected. Therefore, other factors influencing cell life, such as anode recharge efficiency, are expected to determine cell life, rather than dry out or flooding.

As an alternative means to exchanging air by diffusion through the single air exchange opening 140 in accordance with the second aspect of the invention, a second air exchange opening 141 may be provided as shown in FIG. 11 by the dashed lines. The second air exchange opening 141 is disposed on the low pressure side of the fan 142 such that ambient air is drawn into the housing 104 through the second air exchange opening 141 and a portion of the recirculated air is discharged from the housing 104 through the air exchange opening 140.

In this configuration, because ambient air is 21% oxygen, 4.76 times as much ambient air must be drawn into the housing 104 as the amount of oxygen consumed by the cells in order to replace that oxygen consumed. Thus, that rate of replacement of 4.76 times the oxygen consumption rate is the stoichiometric rate of air. For example, if oxygen is consumed at the rate of 1 cu. ft. per minute, the ambient air necessary to replace that consumption is 4.76 cu. ft. per minute of which 21% or 1 cu. ft. per minute is oxygen. Thus, the openings must be sized to exchange air at a rate of at least 4.76 times the oxygen consumption rate.

However, to prevent the concentration of oxygen from varying too greatly as it flows through the channels 212, which can cause uneven discharge of the zinc anodes 180, the air exchange openings 140 and 141 are preferably sized to exchange a sufficient amount of air to maintain a minimum 10% concentration of oxygen in the reactant air stream. If the ambient air entering the housing is 21% oxygen and the desired concentration of oxygen after the reaction of the air with the cells is 10%, thus $O_c=(0.21-0.10) Qi = 0.11 Qi$, where $O_c$ is the oxygen consumed by the cells and Qi is the flow of make-up air. Thus, oxygen consumed is the difference of 11% of the incoming flow of make-up ambient air. Solving for the incoming flow, the flow rate of air entering the housing should be 9.1 times the rate at which oxygen is consumed. Returning to the earlier example, if oxygen is consumed at the rate of 1 cu. ft. per minute, the ambient air flow necessary to maintain the 10% oxygen concentration is 9.1 cu. ft. per minute of which 11% or 1 cu. ft. per minute of oxygen will be consumed, leaving the desired 10% oxygen concentration. Thus, it is preferred that the openings be sized to exchange air at a rate of 9.1 times the oxygen consumption rate, which is about 1.9 times the stoichiometric rate of air. This make-up air rate minimizes the amount of new air admitted by supplying air containing oxygen substantially equal to the oxygen depleted by operation of the cell.

During the recharging of the metal-air battery pack 102, hydrogen and oxygen gases are generated by the metal-air cells 162. The hydrogen gas is released through the vent systems 190 at the cell lids 174 while the oxygen gas is released through the cathode assemblies at the cell bottoms 169. The generated hydrogen gas enters the channel 212 directly adjacent to the vent system 190 of each cell and the oxygen gas enters the channel 212 directly adjacent to the cathode assembly of each cell. Thus, the two gases may be in close proximity. Due to the explosive properties of hydrogen gas in the presence of oxygen gas, such as could exist during recharging, the fan 142 is operated during recharging to remove the generated gases from the channels 212 during recharging. Preferably, the fan 142 is pulsed on for 10 seconds and then off for the same to create a pulsating air flow through the channels 212 during recharging. By pulsing the fan 142, a sufficient air flow is created to remove the gases from the channels without continually running the fan 142 which can further dry or flood a cell. The pulsating air flow circulates the generated gases from the channels to a catalyst element 200 disposed in the path of the air flow. So disposed, the catalyst element 200 is cooled by the air flow.

The catalyst element 200 is a bed of activated alumina spheres 201 coated or impregnated with a material that catalyzes the recombination of hydrogen and oxygen gas, such as palladium, platinum or rhodium. Of these palladium is preferred because of its relatively low cost and efficiency. The bed of catalyst spheres is held in place by an air permeable supporting structure, such as a wire mesh (not shown).

In one embodiment of the invention, the catalyst element 200 is disposed on the surface of the deflector 220 facing the fan 142 (FIGS. 6 and 11). In another embodiment, the catalyst element 200 is disposed directly in front of the fan 142 (FIG. 13). Upon passing through the catalyst element 200, the hydrogen and oxygen gases are recombined to form water. Thus, the air is freed of the generated hydrogen gas and may be safely recirculated.

Alternatively, hydrogen vents could be provided in the housing 104 for venting hydrogen gas generated during recharge to prevent its accumulation.

From the foregoing description of the preferred embodiments and the several alternatives, other alternative constructions of the present invention may suggest themselves to those skilled in the art. Therefore, the scope of the present invention is to be limited only by the claims below and equivalents thereof.

We claim:

1. An air manager system for a metal-air cell having an air cathode and anode, said system comprising a reactant air channel adjacent to said cathode to provide reactant air, comprising:

means for directing a flow of air adjacent to the air cathode to provide reactant air;

means for removing the reactant air from adjacent to the air cathode and for recirculating the flow of the reactant air back to the cathode;

means for admitting ambient air into the flow of said recirculating reactant air in an amount sufficient only to approximately replace oxygen removed from said recirculating reactant air by said cell;

means for controlling said amount of ambient air entering the flow of reactant air, comprising:

a current monitoring circuit connected to measure an output current drawn from said metal-air cell by a load during operation of said load; and an oxygen control circuit responsive to said current drawn to open said means for admitting ambient air for a predetermined time to provide air to said metal-air cell when said current is insufficient to meet load demand.

2. The apparatus of claim 1 further comprising means for controlling air entering the recirculation system to maintain an output current density.

3. The apparatus of claim 1 wherein said means for recirculating the flow of air adjacent to said cathode defines a pathway from an exit location of said cathode to an entry location of said cathode.

4. The apparatus of claim 3 further comprising a humidifier incorporated into said air passageway.

5. The apparatus of claim 4 further comprising a bypass channel for selectively directing said air around the humidifier.

6. The apparatus of claim 5 further comprising a humidity monitor means for selectively directing said air through said bypass channel.

7. The apparatus of claim 3 wherein said reactant air plenum encloses said cathode so as to define a closed volume communicating with said pathway.

8. The apparatus of claim 7 further comprising an oxygen generator connected to deliver oxygen to said closed pathway.

9. The apparatus of claim 7 further comprising means for admitting an amount of new air into said closed volume.

10. The apparatus of claim 9 further comprising means for exhausting from said closed volume an amount of air corresponding to said new air admitted.

11. An air manager system for a metal-air cell having an air cathode and defining a reactant air plenum, comprising:
   an air passageway connected at one end thereof to said plenum at an air inlet and at another end thereof to said plenum at an air outlet;
   said connected plenum and passageway forming a recirculation system isolated from general air circulation around said cell;
   means for circulating air around said recirculation system; and
   means for replacing air within said recirculation system in an amount sufficient only approximately to replace oxygen removed by operation of said cell.

12. An air manager system for a metal-air cell having an air cathode assembly and defining a reactant air plenum, said metal-air cell enclosed within a cell housing, comprising:
   an air passageway connected at one end thereof to said plenum at an air inlet and at another end thereof to said plenum at an air outlet;
   said connected plenum and passageway forming a recirculation system isolated from general air circulation around said cell;
   an air moving device for circulating air around said recirculation system; and
   at least one air exchange opening defined in said pathway for admitting only ambient air to said recirculation system, the rate of flow of said amount of ambient air being minimized to a rate needed to replace oxygen depleted by operation of said cell.

13. The apparatus of claim 12 wherein the opening is sized to permit a flow equal to the inverse of the difference between the percent of oxygen in the ambient air minus the desired oxygen content of the make-up air within said housing.

14. The apparatus of claim 13 wherein said opening is sized to permit an air flow rate of 9.1 times the rate at which oxygen is consumed.

15. The air manager system of claim 12, wherein said air inlet is open to said air plenum on a first side of said cell and said air outlet end is open to said air plenum on a second opposite side of said cell such that air flows through said pathway from said first side to said opposite second side.

16. The air manager system of claim 12, wherein said amount of ambient air admitted is in an amount such that the oxygen concentration of the air in said air reactant air path is maintained between 7 and 19 percent.

17. The air manager system of claim 12, wherein said air moving device for directing said flow of air throughout said channels is within said air plenum.

18. The air manager system of claim 17, wherein said air moving device is in said air plenum and said air exchange opening is on a positive pressure side of said air moving device.

19. The air manager system of claim 12, wherein said air exchange opening has an area from between about 0.05 square inch to about 0.15 square inch.

20. The air manager system of claim 12, wherein said air cathode assembly comprises a perforated air plenum enclosing an air cathode so as to define a select volume interacting with said pathway.

21. The air manager system of claim 12, wherein said metal-air cell is rechargeable, said rechargeable metal-air cell generating oxygen and hydrogen gas within said housing during cell charging, further comprising a catalyst element positioned within said housing, said catalyst element catalyzing a recombination of oxygen and hydrogen gas.

22. The air manager system of claim 17, wherein said catalyst element is positioned within said pathway.

23. The air manager system of claim 17, wherein said catalyst element is positioned in the path of said flow of air from said air moving device.

24. The air manager system of claim 20, wherein said air moving device pulsates during cell charging, said pulsating air moving device creating a pulsating air flow.

25. The air manager system of claim 23, wherein said catalyst element is palladium.

26. A metal-air power supply including a metal-air cell for providing energy to a load, wherein said load has a plurality of modes of operation, comprising:
   an air cathode and an anode;
   a reactant air pathway directed adjacent to said cathode, said pathway being operative for directing a flow of air adjacent to the air cathode to provide reactant air and for removing the reactant air from adjacent to the air cathode;
   an adjustable air inlet for admitting ambient air into the flow of said recirculating reactant air;
   an output monitoring circuit connected to measure an output current drawn from said metal-air cell during operation of said load; and
   output control means, connected to said load, for monitoring the mode of operation of said load and for operating said air inlet responsive to the mode of operation of said load.

27. The apparatus of claim 26 wherein said output control means adjusts said air inlet to a predetermined optimum position for the detected mode of operation.

28. The apparatus of claim 27 wherein said output control means further comprises means for storing a value for the optimum air inlet position for a particular mode of operation of said load.

29. The apparatus of claim 28 wherein said output control means adjusts said air inlet to a predetermined optimum position based on said value stored for the optimum air inlet position stored in said means for storing.

30. The apparatus of claim 29 wherein said output control means further comprises means for determining whether said air inlet position is positioned at the predetermined optimum position based on the mode of operation of said load and for adjusting said air inlet when said air inlet is not positioned at the predetermined optimum position.

31. The apparatus of claim 30 further comprising means for determining the amount of current being drawn by said load, and means for adjusting said air inlet based on a comparison of the mode of operation of said load with said amount of current being drawn.

32. The apparatus of claim 31 wherein said output control means further comprises a timer and means for starting said timer when said air inlet position is not at the optimum position for the present mode of operation of said load and said current drawn is less than the minimum current required for the present mode of operation of said load and wherein said output control means adjusts said air inlet position to the preselected optimum position after said timer indicates that a preselected time limit has expired.

33. An air manager system for an metal-air battery, comprising:
   a housing,
   an arrangement of one or more cell stacks within said housing, said cell stacks each further comprising a plurality of metal-air cells each having a cell casing and an air cathode assembly, said cells positioned at spaced apart levels by one or more spacer barriers extending between each said air cathode assembly and a facing wall, said facing wall being a portion of said housing or of the cell casing of an adjacent cell;

an air pathway, said air pathway comprising:

a plurality of channels, said channels defined by said spacer barriers and by said facing walls, said channels each having an air inlet end and an air outlet end; and an air plenum defined within said housing, said air plenum opened to said air inlet ends and to said air outlet ends of said channels an air moving device positioned to direct a flow of air throughout said channels from said air inlet end to said air outlet end, the air becoming depleted of oxygen in said channels by the operation of said cells; and at least one air exchange opening in said pathway for exchanging a select amount of the depleted air with ambient air from outside of said housing through said air exchange opening, said select amount based on the oxygen depleted by the operation of said cells, the non-exchanged depleted air being recirculated with said ambient air by said air moving device.

34. The air manager system of claim 33, wherein said air inlet ends of said channels are open to said air plenum on a first side of said cell stack arrangement and said air outlet ends are open to said air plenum on a second opposite side of said cell stack arrangement such that air flows through said channels of said cell stacks from said first side to said opposite second side.

35. The air manager system of claim 33, wherein said spacer barriers are positioned such that, at each level, air flows from said air inlet end of said channel adjacent to a portion of said air cathode assembly in a first direction and then in an opposite direction adjacent to the remaining portion of said air cathode assembly to said air outlet end.

36. The air manager system of claim 33, wherein said cell stacks are positioned adjacent to each other, and said air cathode assemblies are spaced apart an equal distance in said adjacent cell stacks, said channels being between the same levels of cells in said adjacent cells stacks such that said channels each span all of said cell stacks.

37. The air manager system of claim 33, wherein said spacer barriers are positioned in said channels such that, at each channel, air flows from said air inlet end of said channel adjacent to a portion of said air cathode assemblies in a first direction and then in an opposite direction adjacent to the remaining portion of said air cathode assemblies to said air outlet end.

38. The air manager system of claim 33, wherein said select amount of air exchanged is in an amount such that the oxygen concentration of the air in said air plenum is maintained between 7 and 19 percent.

39. The air manager system of claim 33, wherein said air moving device for directing said flow of air throughout said channels is within said air plenum.

40. The air manager system of claim 33, wherein said air moving device is in said air plenum and said air exchange opening is on a positive pressure side of said air moving device.

41. The air manager system of claim 33, wherein said air exchange opening has an area from between about 0.05 square inch to about 0.15 square inch.

42. The air manager system of claim 33, wherein said air cathode assembly comprises a perforated air plenum enclosing an air cathode so as to define a select volume interacting with said channels.

43. A rechargeable metal-air battery comprising:

a housing;

at least one metal-air cell within said housing, said metal-air cell generating oxygen and hydrogen gas during cell charging;

an air flow path within said housing, a catalyst element positioned in said air flow path, said catalyst element catalyzing the recombination of oxygen and hydrogen gas; and an air moving device for directing a flow of the generated oxygen and hydrogen gas from said cells to said catalyst element during cell charging.

44. The air manager system of claim 43, wherein said air moving device pulsates during cell charging, said pulsating air moving device creating a pulsating air flow.

45. The air manager system of claim 43, wherein said air flow path is a recirculation air flow path directing gas flowing from said cells back to said cells.

* * * * *